(12) United States Patent
Imamura et al.

(10) Patent No.: US 10,525,816 B2
(45) Date of Patent: Jan. 7, 2020

(54) DRIVE UNIT FOR HYBRID VEHICLES

(71) Applicant: TOYOTA JIDOSHA KABUSHIKI KAISHA, Toyota-shi, Aichi-ken (JP)

(72) Inventors: Tatsuya Imamura, Okazaki (JP); Hideaki Komada, Gotemba (JP); Takahito Endo, Shizuoka-ken (JP); Kensei Hata, Shizuoka-ken (JP); Akiko Nishimine, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 5 days.

(21) Appl. No.: 15/922,351

(22) Filed: Mar. 15, 2018

(65) Prior Publication Data

US 2018/0264924 A1    Sep. 20, 2018

(30) Foreign Application Priority Data

Mar. 17, 2017    (JP) .................................. 2017-052496

(51) Int. Cl.
 B60K 6/36    (2007.10)
 F16H 3/72    (2006.01)
 (Continued)

(52) U.S. Cl.
 CPC .............. B60K 6/365 (2013.01); B60K 6/387 (2013.01); B60K 6/445 (2013.01); B60W 20/20 (2013.01); B60W 20/30 (2013.01); B60W 20/40 (2013.01); F16H 3/728 (2013.01); B60K 2006/381 (2013.01); F16H 2200/201 (2013.01); F16H 2200/2007 (2013.01);
 (Continued)

(58) Field of Classification Search
 CPC ... B60K 6/36; B60K 6/38; B60K 6/54; B60K 6/365; B60K 6/387; B60K 6/445; B60K 2006/381; B60W 20/20; B60W 20/30; B60W 20/40; F16H 3/728; F16H 2200/2007; F16H 2200/201; F16H 2200/2038; Y02T 10/6239; Y02T 10/7258
 USPC .................................................. 180/65.235
 See application file for complete search history.

(56) References Cited

U.S. PATENT DOCUMENTS 7,264,071 B2 *  9/2007  Schmidt ................... B60K 6/26
                                                   180/65.6
8,313,401 B2 * 11/2012  Kim ....................... B60K 6/365
                                                      475/5
(Continued)

FOREIGN PATENT DOCUMENTS

JP    2016-150673 A    8/2016
JP    2017-178299 A   10/2017
WO   2013-114594 A1    8/2013

*Primary Examiner* — John D Walters
(74) *Attorney, Agent, or Firm* — Hunton Andrews Kurth LLP

(57) ABSTRACT

Provided is a drive unit for a hybrid vehicle which can increase selectable modes in an EV mode. A drive unit includes a first planetary gear unit connected to an engine, and a second planetary gear unit connected to a second rotary element of the first planetary gear unit. The drive unit includes a first engagement device which connects rotary elements of the first planetary gear unit, a third rotary element in the first planetary gear unit, a second engagement device which connects any one of a fifth rotary element and a sixth rotary element in the second planetary gear unit, and a third engagement device which can fix a first rotary element of the first planetary gear unit.

15 Claims, 23 Drawing Sheets

(51) Int. Cl.
*B60K 6/365* (2007.10)
*B60K 6/445* (2007.10)
*B60K 6/387* (2007.10)
*B60W 20/30* (2016.01)
*B60W 20/40* (2016.01)
*B60W 20/20* (2016.01)
*B60K 6/38* (2007.10)

(52) U.S. Cl.
CPC ... *F16H 2200/2038* (2013.01); *Y02T 10/6239* (2013.01); *Y02T 10/7258* (2013.01)

(56) References Cited

U.S. PATENT DOCUMENTS

| | | | |
|---|---|---|---|
| 8,337,352 B2 * | 12/2012 | Morrow | B60K 6/365 475/5 |
| 2015/0021110 A1 | 1/2015 | Ono et al. | |
| 2018/0022203 A1 | 1/2018 | Banshoya et al. | |

* cited by examiner

| | | | | CL1 | BK | CL2 | MG1 | MG2 | No. |
|---|---|---|---|---|---|---|---|---|---|
| EV | Forward/Reverse | Single-Motor | 1st | | | | | M | 1 |
| | | | 2nd | △ | | △ | G | M | 2 |
| | | Dual-Motor | 3rd | | ○ | ○ | M | M | 3 |
| | | | 4th | ○ | ○ | | M | M | 4 |
| HV | Input Split U/D | Forward | 5th | | | ○ | G | M | 5 |
| | | Reverse | 6th | | | ○ | G | M | 6 |
| | Input Split O/D | Forward | 7th | ○ | | | G | M | 7 |
| | | Reverse | 8th | ○ | | | G | M | 8 |
| | FIXED STAGE | Forward | 9th | ○ | | ○ | | | 9 |

○: Engagement  △: Engaged to Establish Engine Brake
G: Generator  M: Motor  Blank: Disengagement Fig.19
| | | | | CL1 | BK | CL2 | MG1 | MG2 | No. |
|---|---|---|---|---|---|---|---|---|---|
| EV | | Forward/Reverse | Single-Motor | 1st | | | | | M | 1 |
| | | | | 2nd | △ | | △ | G | M | 2 |
| | | | Dual-Motor | 3rd | ○ | ○ | | M | M | 3 |
| | | | | 4th | | ○ | ○ | M | M | 4 |
| ENG | Input Split U/D | Forward | | 5th | ○ | | | G | M | 5 |
| | | Reverse | | 6th | ○ | | | G | M | 6 |
| | Input Split O/D | Forward | | 7th | | | ○ | G | M | 7 |
| | | Reverse | | 8th | | | ○ | G | M | 8 |
| FIXED STAGE | Forward | | | 9th | ○ | | ○ | | | 9 |
○: Engagement △: Engaged to Establish Engine Brake
G: Generator M: Motor Blank: Disengagement
Fig.20
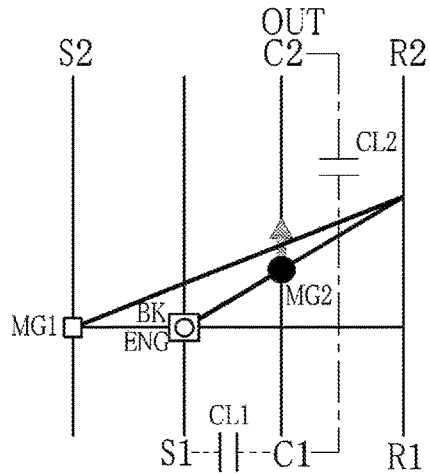
Fig.21
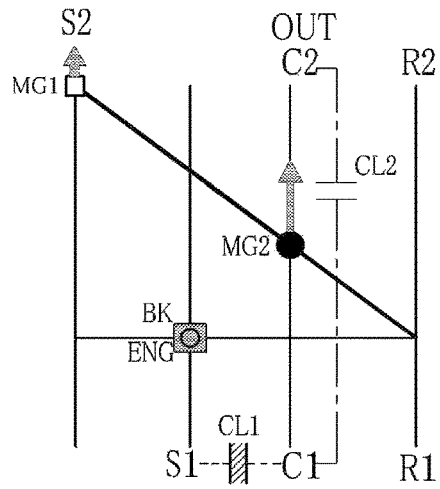

DRIVE UNIT FOR HYBRID VEHICLES

CROSS REFERENCE TO RELATED APPLICATIONS

The present disclosure claims the benefit of Japanese Patent Application No. 2017-052496 filed on Mar. 17, 2017 with the Japanese Patent Office.

BACKGROUND

Field of the Disclosure

Embodiments of the present disclosure relate to the art of a drive unit for a hybrid vehicle which includes a first differential mechanism connected to an internal combustion engine and a second differential mechanism connected to the first differential mechanism.

Discussion of the Related Art

JP-A-2016-150673 and PCT international publication WO 2013/114594 describe a power transmission device for a hybrid vehicle which includes a first planetary gear unit connected to an engine, a first motor, and a second planetary gear unit which is connected to the first planetary gear unit and an output member.

According to the teachings of the above-mentioned prior art documents, a hybrid mode is selectable from a low gear mode and a high gear mode. An electric vehicle mode includes a dual-motor mode in which the vehicle is propelled by drive torques generated by of the first motor and the second motor.

However, in the drive unit taught by the above-mentioned prior art documents, the torque of the second motor is added to the torque generated by the second planetary gear unit. Therefore, the second planetary gear unit as a transmission is not able to increase or decrease the torque of the second motor. Therefore, in the conventional power transmission device for the hybrid vehicle, selectable modes in the electric vehicle mode is rather small, and there is a need to improve electricity efficiency.

SUMMARY

Aspects of embodiments of the present disclosure have been conceived noting the foregoing technical problems, and it is therefore an object of embodiments of the present disclosure is to provide a drive unit for a hybrid vehicle in which selectable operating modes in an electric vehicle mode are increased.

The present disclosure relates to a drive unit for a hybrid vehicle wherein a prime mover includes an engine, a first motor, and a second motor, and wherein a drive torque generated by the prime mover is delivered to an output element connected to drive wheels. In order to achieve the above-explained objective, the drive unit is characterized by: a first differential mechanism that includes a first rotary element connected to the engine, a second rotary element, and a third rotary element; a second differential mechanism that includes a fourth rotary element connected to the second rotary element, a fifth rotary element connected to the first motor, and a sixth rotary element connected to the second motor and the output element; a first engagement device that connects any two of the first rotary element, the second rotary element, and the third rotary element when engaged; a second engagement device that connects the third rotary element to any one of the fifth rotary element and the sixth rotary element when engaged; and a third engagement device that connects the first rotary element and a predetermined stationary member when engaged.

In a non-limiting embodiment, the first engagement device may be configured to selectively connect two rotary elements among the first to third rotary elements. For example, the first engagement device may be configured to connect the first rotary element and the second rotary element, the first rotary element and the third rotary element, or the second rotary element and the third rotary element.

In a non-limiting embodiment, planetary gear unit which includes a sun gear, a ring gear, and a carrier may be employed as the first differential mechanism and the second differential mechanism.

In a non-limiting embodiment, according to the disclosure, the vehicle can be operated in the EV mode when the engine stops operating, and outputs the drive torque from the first motor and the second motor. In the EV mode, a torque transmission ratio between the fifth rotary element and the sixth rotary element is switched between two different ratios in a case where the third engagement device is engaged and any one of the first engagement device and the second engagement device is engaged, and a case where the third engagement device is engaged and the other one of the first engagement device and the second engagement device is engaged. Therefore, the selectable modes in the EV mode can be increased in the drive unit for the hybrid vehicle.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 19 is a table indicating operating modes selectable in the drive unit illustrated in FIG. 18;

FIG. 20 is a nomographic diagram indicating an operating condition in the first mode shown in FIG. 19;

FIG. 21 is a nomographic diagram indicating an operating condition of the third mode shown in FIG. 19;

DETAILED DESCRIPTION OF THE PREFERRED EMBODIMENT(S)

Figure 1:
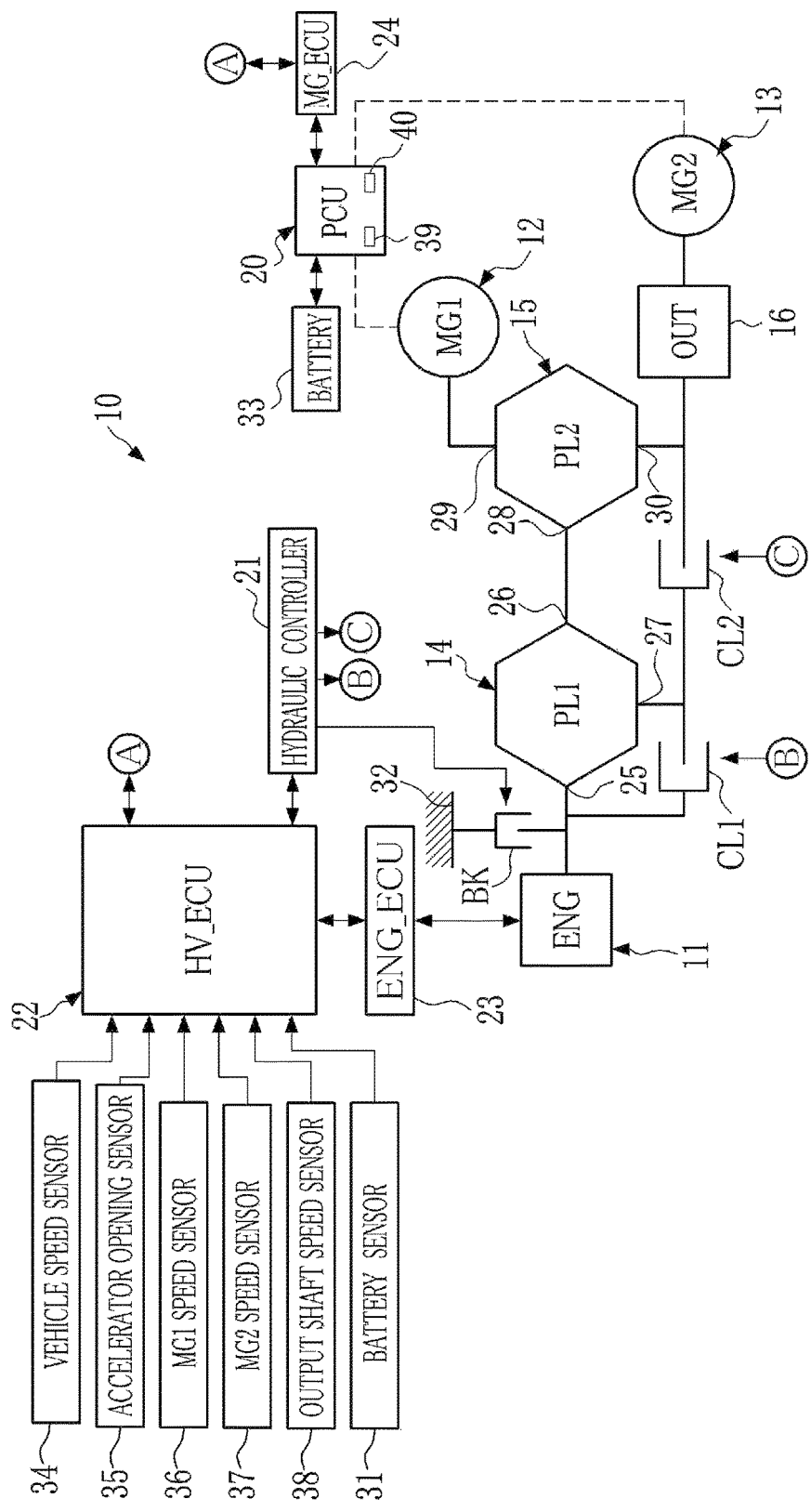
FIG. 1 is a block diagram conceptually illustrating an example of a drive unit of a hybrid vehicle according to the embodiment of the disclosure.

FIG. 1 conceptually illustrates an example of a drive unit 10 used in a hybrid vehicle (hereinafter, referred to as "vehicle") according to the embodiments of the disclosure. As illustrated in FIG. 1, the drive unit 10 includes an engine (referred to as "ENG" in the drawings) 11 which is an internal combustion engine, a first motor (referred to as "MG1" in the drawings) 12, a second motor (referred to as "MG2" in the drawings) 13, a first planetary gear unit (referred to as "PL1" in the drawings) 14 as a first differential mechanism, a second planetary gear unit (referred to as "PL2" in the drawings) 15 as a second differential mechanism, an output member (referred to as "OUT" in the drawings) 16, a first clutch CL1, a second clutch CL2, a brake BK, a power control unit (referred to as "PCU" in the drawings) 20, a hydraulic controller 21, an HV-ECU (Hybrid Vehicle Electronic Control Unit) 22 which controls the hybrid vehicle, an ENG-ECU (Engine Electronic Control Unit) 23 which controls the engine 11, and an MG-ECU (Motor-Generator Electronic Control Unit) 24 which controls the motors 12 and 13, and a battery 33. Further, the battery 33 includes a secondary battery or a capacitor, and the hybrid vehicle may be a plug-in hybrid vehicle which is chargeable by an external power source.

For example, a motor-generator may be used individually as the first motor 12 and the second motor 13. In the drive unit 10, the second motor 13 may be operated by electricity generated by the first motor 12 to generate power to propel the vehicle The first planetary gear unit 14 performs a differential action among a first rotary element 25 to which torque generated by the engine 11 is applied, a second rotary element 26, and a third rotary element 27. The second planetary gear unit 15 performs the differential action among a fourth rotary element 28 which is connected to the second rotary element 26, a fifth rotary element 29 which is connected to the first motor 12, and a sixth rotary element 30 which is connected to the output member 16.

The first clutch CL1 is configured to selectively connect at least two rotary elements in the first planetary gear unit 14 to integrally rotate all of the rotary elements of the first planetary gear unit 14. Specifically, the first clutch CL1 selectively connects the first rotary element 25 and the second rotary element 26, or selectively connects the first rotary element 25 and the third rotary element 27, or selectively connects the second rotary element 26 and the third rotary element 27. In the drive unit 10, the first clutch CL1 selectively connects the first rotary element 25 and the third rotary element 27.

The first planetary gear unit 14 and the second planetary gear unit 15 connect the third rotary element 27 to the fifth rotary element 29 or to the sixth rotary element 30 through the second clutch CL2 so as to form a complex planetary gear unit. Specifically, in the drive unit 10, the first planetary gear unit 14 and the second planetary gear unit 15 are connected by engaging the second clutch CL2 to connect the third rotary element 27 and the sixth rotary element 30.

The brake BK is provided between the first rotary element 25 and a stationary member 32, and selectively connects the first rotary element 25 and the stationary member 32.

In the drive unit 10, the first clutch CL1 and the second clutch CL2 are manipulated hydraulically and, for example, a friction clutch such as a multi-plate wet clutch or a dog clutch may be employed. Similarly, the brake BK is manipulated hydraulically and, for example, a friction brake or a dog brake may be employed. The hydraulic controller 21 individually controls hydraulic pressures to be applied to the first clutch CL1, the second clutch CL2, and the brake BK according to a command value transmitted from the HV_ECU 22.

To the HV_ECU 22, a vehicle speed sensor 34, an accelerator sensor 35, an MG1 speed sensor 36, an MG2 speed sensor 37, an output shaft speed sensor 38, and a battery sensor 31 are connected. In other words, information about a depression of an accelerator pedal, a vehicle speed, an output speed of the first motor 12, an output speed of the second motor 13, a speed of the output member 16, and a State Of Charge level (to be abbreviated as the "SOC" hereinafter) of the battery 33 etc. is sent to the HV_ECU 22. The HV_ECU 22 transmits a command signal to the hydraulic controller 21, the ENG_ECU 23, and the MG_ECU 24 to control the engine 11, the first motor 12, and the second motor 13 on the basis of the information. The ENG_ECU 23 controls the engine 11 on the basis of the command signal sent from the HV_ECU 22, and the MG_ECU 24 controls the PCU 20 on the basis of the command signal sent from the HV_ECU 22.

The PCU 20 includes a converter 39 and an inverter 40 which perform power conversion between the battery 33 and the first motor 12 and the second motor 13. Specifically, the PCU 20 is configured to supply electric power to these motors to drive the first motor 12 and the second motor 13, and to accumulate electric power generated by the first motor 12 and the second motor 13 in the battery 33.

First Embodiment

Figures 2, 3:
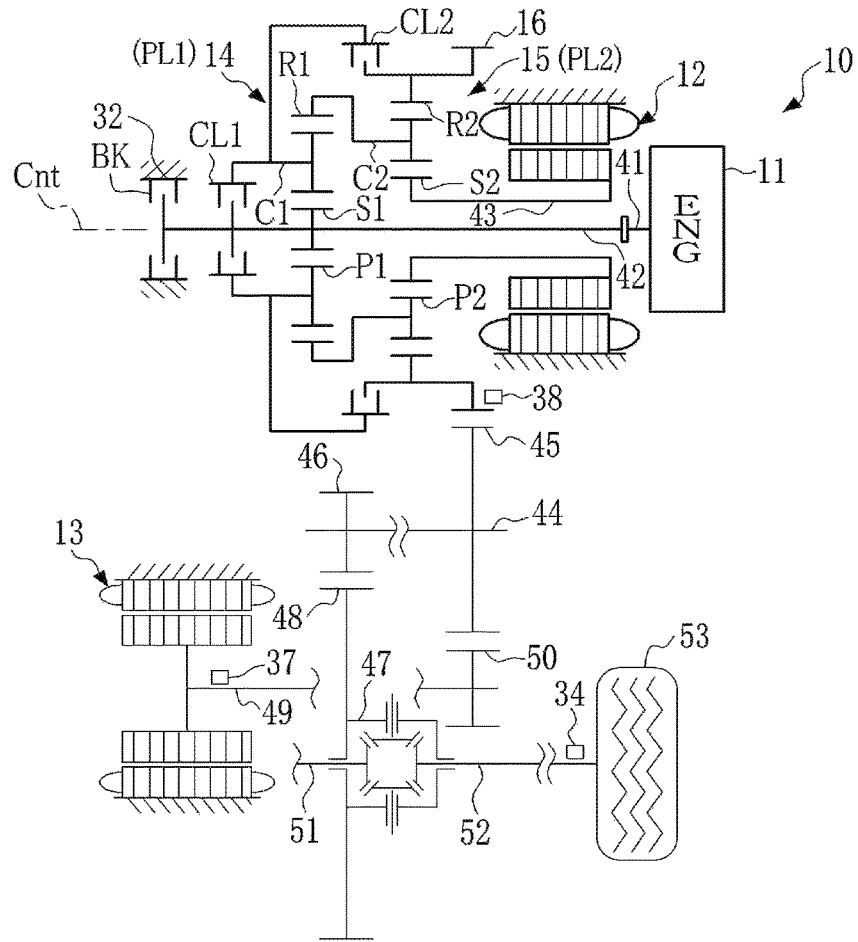
FIG. 2 is a skeleton diagram illustrating the drive unit of a first embodiment.
FIG. 3 is a table indicating the operating modes selectable in the drive unit illustrated in FIG. 2.

FIG. 2 illustrates the drive unit 10 in more detail. The drive unit 10 illustrated in FIG. 2 is a pluriaxial type of drive unit in which an input shaft 42 of the first planetary gear unit 14 and a rotor 49 of the second motor 13 are arranged on different axes. The drive unit 10 includes the engine 11, the first motor 12, the second motor 13, the first planetary gear unit 14, the second planetary gear unit 15, the first clutch CL1, the second clutch CL2, the brake BK, a differential gear 47, and a drive wheel 53. The drive unit 10 illustrated in FIG. 2 is an example adapted to a vehicle such as a front engine/front drive vehicle (FF-layout vehicle) or a rear engine/rear drive vehicle (RR vehicle) in which the vehicle is mounted transversely.

The first planetary gear unit 14 is a single-pinion planetary gear unit which is adapted to perform a differential action among three rotary elements. Specifically, the first planetary gear unit 14 includes: a first sun gear S1 to which an output shaft 41 of the engine 11 is connected; a first ring gear R1 as an internal gear arranged concentrically with the first sun gear S1; a plurality of first pinion gears P1 interposed between the first sun gear S1 and the first ring gear R1; and a first carrier C1 which rotatably supports the first pinion gear P1.

The first planetary gear unit 14 is arranged on the common axial line Cnt as that of the output shaft 41 of the engine 11. The first sun gear S1 is fitted onto the input shaft 42 of the first planetary gear unit 14, and the input shaft 42 is connected to the output shaft 41 of the engine 11 to apply a drive torque generated by the engine 11 to the first sun gear S1. Optionally, the first sun gear S1 may be connected to the input shaft 42 through a gear unit, or may be connected to the input shaft 42 and the output shaft 41 through a damper or a torque converter. In the first planetary gear unit 14, the first sun gear S1 serves as the first rotary element 25, the first ring gear R1 serves as the second rotary element 26, and the first carrier C1 serves as the third rotary element 27.

The second planetary gear unit 15 is also a single-pinion planetary gear unit which is adapted to perform a differential action among three rotary elements. Specifically, the second planetary gear unit 15 includes: a second sun gear S2 which is connected to a rotor 43 of the first motor 12; a second ring gear R2 as an internal gear arranged concentrically with the second sun gear S2 and rotated integrally with the output member 16; a plurality of second pinion gears P2 interposed between the second sun gear S2 and the second ring gear R2; and a second carrier C2 connected to the first ring gear R1 while supporting the second pinion gear P2 rotatably. In the second planetary gear unit 15, the second carrier C2 serves as the fourth rotary element 28, the second sun gear S2 serves as the fifth rotary element 29, and the second ring gear R2 serves as the sixth rotary element 30.

The first carrier C1 and the first sun gear S1 are connected selectively by manipulating the first clutch CL1 as a first engagement device. For example, the first carrier C1 and the first sun gear S1 are connected by engaging the first clutch CL1 so that the differential action of the first planetary gear unit 14 is restricted. The second ring gear R2 and the first carrier C1 are connected selectively by manipulating the second clutch CL2 as a second engagement device. For example, the first planetary gear unit 14 and the second planetary gear unit 15 are connected by engaging the second clutch CL2 to form the complex planetary gear unit, so that the power can be delivered according to a power split ratio of the complex planetary gear unit. The brake BK as a third engagement device includes a one-way clutch which prevents the output shaft 41 of the engine 11 from inversely rotating. the input shaft 42 and the stationary member 32 are selectively connected to each other by manipulating the brake BK.

In the drive unit 10, a counter shaft 44 is arranged in parallel with the axial line Cnt. A driven gear 45 is fitted onto one end of the counter shaft 44 while being meshed with the output member 16, and a drive gear 46 is fitted onto the other end of the counter shaft 44 while being meshed with a ring gear 48 of the differential gear 47 as a final reduction. A drive gear S0 fitted onto the rotor 49 of the second motor 13 is also meshed with the driven gear 45. Therefore, the drive torque generated by the second motor 13 is added to the drive torque delivered from the output member 16 at the driven gear 45. The synthesized drive torque is delivered to the drive wheel 53 from the differential gear 47 through drive shafts 51 and 52.

FIG. 3 is a table indicating the operating mode available in the drive unit 10 illustrated in FIG. 2. The operating mode of the drive unit 10 can be shifted among the first mode to the ninth mode by manipulating the first clutch CL1, the second clutch CL2, the brake BK, the engine 11, the first motor 12, and the second motor 13 by the HV_ECU 22. In FIG. 3, "blank" represents disengagement of the engagement devices, "○" represents engagement or application of the engagement devices, and "Δ" represents engagement of any one of the first clutch CL1 and the second clutch CL2 and disengagement of the other one to establish an engine braking force, "G" represents a fact that the first motor 12 or the second motor 13 is operated as a generator, and "M" represents a fact that the first motor 12 or the second motor 13 is operated as a motor.

The first mode is a single-motor mode selected in an electric vehicle mode (to be abbreviated as the "EV mode" hereinafter) in a case that the vehicle speed is low and a required drive force is small. Specifically, the first mode is established by disengaging the first clutch CL1, the second clutch CL2, and the brake BK. In the first mode, the second motor 13 is operated as a motor by the electric power supplied from the battery 33 to generate a drive torque to propel the vehicle, and the engine 11 and the first motor 12 are stopped.

A second mode is selected to generate the engine brake in the single-motor mode. Specifically, the second mode is established by engaging any one of the first clutch CL1 and the second clutch CL2 while disengaging the other one. In the second mode, the second motor 13 serves as a motor to generate the drive torque to propel the vehicle, and the first motor 12 serves as a generator. In the second mode, the engine 11 is stopped.

The third mode is a dual-motor mode in the EV mode, and established by disengaging the first clutch CL1 while engaging the second clutch CL2 and the brake BK. The dual-motor mode is selected in a case that the vehicle speed is high and the required drive force is large in the EV mode, and the vehicle is propelled by the drive torques of the first motor 12 and the second motor 13. In other words, the third mode is a low mode of the EV mode in which a multiplication factor of the torque delivered from the first motor 12 to the output member 16 is greater than that in the below-mentioned fourth mode.

The fourth mode is a high mode of the dual-motor mode in which the multiplication factor of the torque delivered from the first motor 12 to the output member 16 is smaller than that in the third mode. Specifically, the fourth mode is set by engaging the first clutch CL1 and the brake BK while disengaging the second clutch CL2. Thus, the EV mode may be switched between the high mode and the low mode by manipulating the complex planetary gear unit. In addition, the output shaft 41 of the engine 11 stops rotating by being engaged with the brake BK in the third mode and the fourth mode to save the fuel.

The fifth mode is a low mode (U/D input split) selected when propelling forward in a hybrid mode (to be abbreviated as the "HV mode" hereinafter), and the fifth mode is established by engaging only the second clutch CL2. Specifically, in the fifth mode, the second motor 13 is operated as a motor while being rotated in a direction to propel the vehicle in the forward direction, and generating a torque in a direction to increase a rotational speed. On the other hand, the first motor 12 is operated as a generator to establish a reaction torque to deliver a drive torque generated by the engine 11 to the drive wheel 53 through the complex planetary gear unit. In other words, the first motor outputs the torque in a direction of lowering the speed of the first motor.

A sixth mode is a reverse mode of the fifth mode. In the sixth mode, specifically, the second motor 13 is also operated as a motor while being rotated in a direction to propel the vehicle in the reverse direction, and generating a torque in a direction to increase a rotational speed.

The seventh mode is a high mode (O/D input split) selected when propelling forward in the hybrid mode, and the seventh mode is established by engaging only the first clutch CL1. In the seventh mode, the second motor 13 is operated as a motor while being rotated in a direction to propel the vehicle in the forward direction, and generating a torque in a direction to increase a rotational speed. On the other hand, the first motor 12 is operated as a generator to establish a reaction torque to deliver a drive torque generated by the engine 11 to the drive wheel 53 through the complex planetary gear unit. In other words, the first motor outputs the torque in a direction of lowering the speed of the first motor.

The eighth mode is a reverse mode of the seventh mode. In the eighth mode, specifically, the second motor 13 is also operated as a motor while being rotated in a direction to propel the vehicle in the reverse direction, and generating a torque in a direction to increase a rotational speed.

The ninth mode is a fixed mode selected when propelling forward in the hybrid mode, and the ninth mode is established by engaging the first clutch CL1 and the second clutch CL2 while disengaging the brake BK. In the ninth mode, the torque of the engine 11 is transmitted through the complex planetary gear unit without being changed. That is, in the ninth mode, a gear ratio of the complex planetary gear unit becomes "1".

Figure 4:
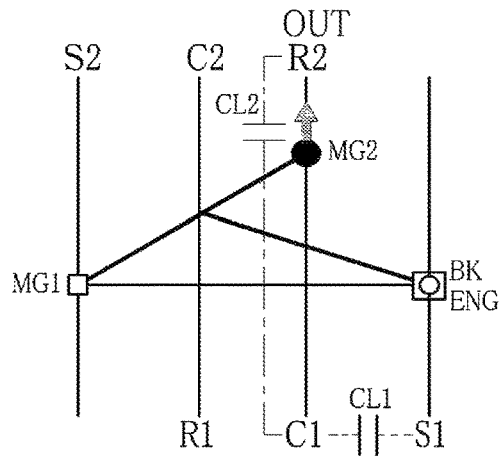
FIG. 4 is a nomographic diagram indicating an operating condition in a first mode shown in FIG. 3.

FIG. 4 indicates an operating condition of the complex planetary gear unit in the first mode. In the nomographic diagrams to be described in the following explanation, the vertical lines individually represent a connection between the rotary elements in the complex planetary gear unit, and each distance between the vertical axes represents a gear ratio. In addition, vertical distances from transverse base line in the vertical axes individually represent a speed of each rotary element.

As illustrated in FIG. 4, in the first mode, the brake BK is disengaged so that the first sun gear S1 is allowed to rotate, and the first clutch CL1 is disengaged so that the first planetary gear unit 14 serves as a differential mechanism. The HV_ECU 22 operates the second motor 13 to generate the drive torque through the MG_ECU 24 to propel the vehicle in the forward direction. In this situation, the second ring gear R2 is rotated forward by the rotation of the drive wheel 53, and the first carrier C1 is rotated forward integrally with the second carrier C2. Since the first clutch CL1, the second clutch CL2, and the brake BK are disengaged, the first planetary gear unit 14 and the second planetary gear unit 15 are individually brought into a neutral state. In the first mode, therefore, the engine 11 and the first motor 12 are not rotated passively, and rotations of the first sun gear S1 and the second sun gear S2 are stopped. Therefore, in the first mode, drag losses in the engine 11 and the first motor 12 are reduced, and hence power consumption can be reduced.

When the battery 33 is fully charged in the first mode, the second motor may be no longer allowed to generate electric power. In addition, since the respective clutches CL1 and CL2 are disengaged in the first mode, the engine brake may not be established. Therefore, when the engine brake is required in the first mode, the first clutch CL1 or the second clutch CL2 is engaged and to shift the operating mode to the second mode. As a result, the engine 11 is connected to the drive wheel 53 so that the engine brake is applied to the drive wheel 53. Specifically, in the second mode, the first clutch CL1 or the second clutch CL2 is engaged to rotate the engine 11 at a predetermined speed, and the fuel supply to the engine 11 is stopped. In addition, by operating the first motor 12 as a motor, a negative torque of the engine 11 is applied to the drive wheel 53. When starting the engine 11 in the first mode, the operating mode is shifted to the second mode so that the first motor 12 can perform cranking of the engine 11.

Figure 5:
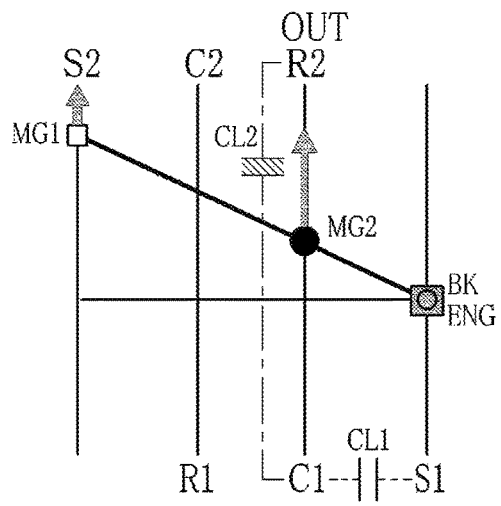
FIG. 5 is a nomographic diagram indicating an operating condition in a third mode shown in FIG. 3.

FIG. 5 indicates an operating condition of the complex planetary gear unit in the third mode. The drive torque generated by the first motor 12 and the drive torque generated by the second motor 13 are synthesized at the driven gear 45, and the vehicle is propelled by the synthesized drive torque. In the third mode, the first planetary gear unit 14 and the second planetary gear unit 15 serve individually as a transmission having a fixed gear ratio by engaging the brake BK.

Since the first clutch CL1 is disengaged and the second clutch CL2 is engaged in the third mode, the first carrier C1 rotates in the forward direction as the rotational direction of the second ring gear R2. The drive torque generated by the first motor 12 is delivered to the second ring gear R2 connected to the output member 16 through the second carrier C2. As described above, the drive torque generated by the second motor 13 is added to the drive torque generated by the first motor 12 which is delivered from the output member 16 through the driven gear 45, and further delivered to the drive wheel 53.

As described above, the third mode is a low mode in which the speed of the output member 16 is lower than the speed of the rotor 43 of the first motor 12. That is, in the third mode, the gear ratio of the complex planetary gear unit is increased greater than "1".

Figure 6:
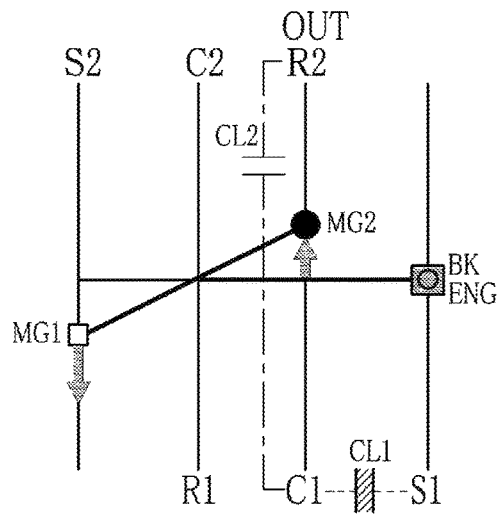
FIG. 6 is a nomographic diagram indicating an operating condition in a fourth mode shown in FIG. 3.

FIG. 6 indicates an operating condition of the complex planetary gear unit in the fourth mode. Similarly to the third mode, in the fourth mode, the drive torque generated by the first motor 12 and the drive torque generated by the second motor 13 are synthesized at the driven gear 45, and the vehicle is propelled by the synthesized drive torque. In the fourth mode, the differential action of the first planetary gear unit 14 is restricted by engaging the first clutch CL1 and the brake BK, and hence the rotations of the rotary elements in the first planetary gear unit 14 are stopped. In this situation, the first motor 12 rotates in the opposite direction to the second motor 13 to generate the torque to increase the speed of the first motor 12. As described above, the second carrier C2 is connected to the first ring gear R1, and the first ring gear R1 is stopped, and thus the second carrier C2 is also left stopped. Therefore, the second carrier C2 establishes the reaction torque to deliver the torque of the first motor 12 to the second ring gear R2.

In the fourth mode, similarly to the third mode, the speed of the output member 16 is lower than that of the rotor 43 of the first motor 12. In other words, the gear ratio of the complex planetary gear unit is increased greater than "1" but smaller than that in the third mode. Therefore, the fourth mode is called a high mode.

Figure 7:
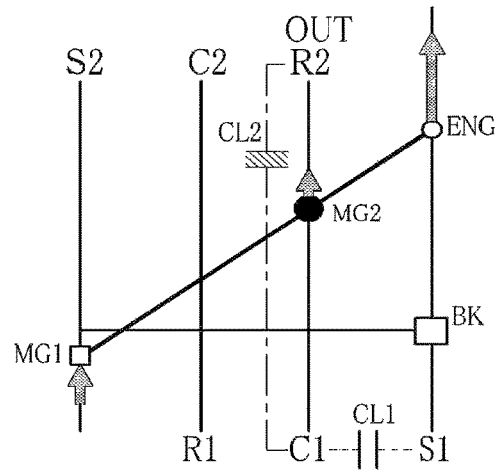
FIG. 7 is a nomographic diagram indicating an operating condition in a fifth mode shown in FIG. 3.

FIG. 7 indicates an operating condition of the complex planetary gear unit in the fifth mode. As described above, the first clutch CL1 and the brake BK are disengaged, and the second clutch CL2 is engaged in the fifth mode, so that the first sun gear S1 serves as an input element, the second sun gear S2 serves as a reaction element, and the second ring gear R2 serves as an output element. Specifically, in the fifth mode, the engine 11 generates power, and the first motor 12 establishes reaction torque to deliver the power of the engine 11 to the second ring gear R2. In this case, since the first motor 12 generates the torque in such a manner as to reduce the rotational speed thereof, the first motor 12 serves as a generator. In other words, the power generated by the engine 11 is partially translated into the electric power by the first motor 12. The translated electric power is supplied to the second motor 13 to generate the drive torque by the second motor 13. The remaining torque of the engine 11 is mechanically delivered to the second ring gear R2 through the complex planetary gear unit. The drive torque delivered from the second motor 13 is synthesized with the engine torque thus delivered mechanically at the driven gear 45, and the vehicle is propelled by the synthesized drive torque.

Further, in the fifth mode, the speed of the second ring gear R2 is reduced lower than a speed of the first sun gear S1 by stopping the rotation of the first motor 12. In other words, the gear ratio of the complex planetary gear unit is increased greater than "1". Therefore, the fifth mode is called an under drive mode.

Figure 8:
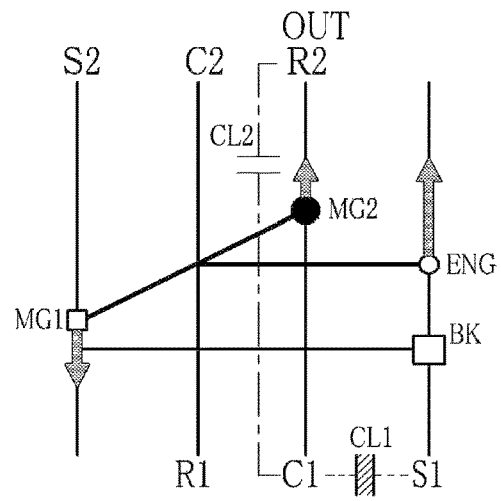
FIG. 8 is a nomographic diagram indicating an operating condition in a seventh mode shown in FIG. 3.

FIG. 8 indicates an operating condition of the complex planetary gear unit in the seventh mode. Similarly to the sixth mode, in the seventh mode, the torque mechanically delivered from the engine 11 through the complex planetary gear unit is synthesized with the torque generated by the second motor 13 by supplying the electric power generated by the first motor 12, and the vehicle is propelled by the synthesized drive torque.

As described, two rotary elements, the first sun gear S1 and the first carrier C1, are connected by engaging the first clutch CL1 in the seventh mode. Therefore, all of the rotary elements in the first planetary gear unit 14 rotate integrally. In other words, the drive torque generated by the engine 11 is directly delivered to the first ring gear R1. In this situation, the first motor 12 establishes the reaction torque to deliver the torque delivered to the first ring gear R1, that is, the torque delivered to the second carrier C2 to the second ring gear R2. In the seventh mode, specifically, the second carrier C2 serves as the input element, the second sun gear S2 serves as the reaction element, and the second ring gear R2 serves as the output element. In the situation shown in FIG. 8, since the first motor 12 generates the torque in a direction of lowering the speed of the first motor 12, the first motor 12 serves as a generator.

In the seventh mode, the speed of the second ring gear R2 is increased higher than that of the first sun gear S1 by stopping the rotation of the first motor 12. In other words, the gear ratio (speed ratio) of the complex planetary gear unit is reduced smaller than "1". Therefore, the seventh mode is called an over drive mode.

Figure 9:
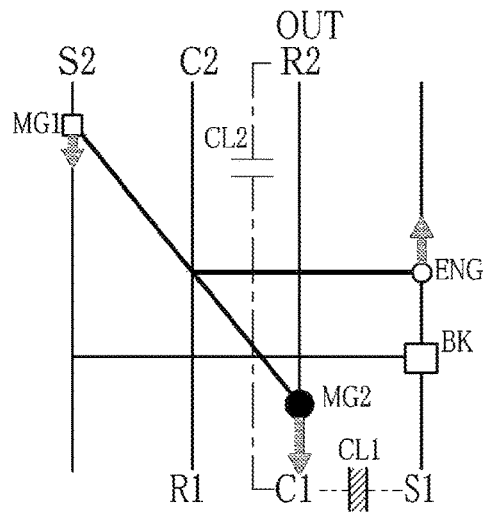
FIG. 9 is a nomographic diagram indicating an operating condition in an eighth mode shown in FIG. 3.

FIG. 9 indicates an operating condition of the complex planetary gear unit in the eighth mode. The eighth mode is a reverse mode of the seventh mode, and the first motor 12 is rotated at a speed higher than the speed (or the engine speed) of the first sun gear S1. In this situation, the second motor 13 generates the torque in a reverse direction while rotating in the reverse direction.

Figure 10:
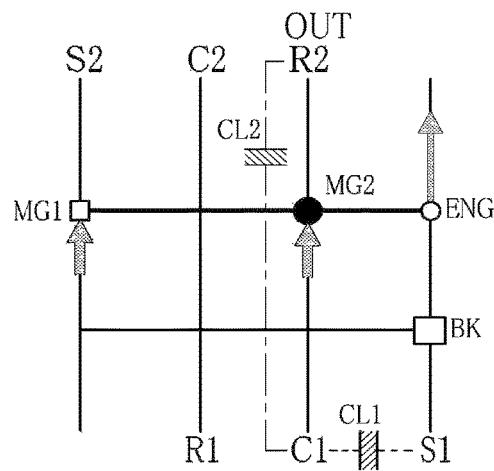
FIG. 10 is a nomographic diagram indicating an operating condition in a ninth mode shown in FIG. 3.

FIG. 10 indicates an operating condition of the complex planetary gear unit in the ninth mode. In the ninth mode, as described above, the first clutch CL1 and the second clutch CL2 are engaged, and the brake BK is disengaged.

In the ninth mode, all of the rotary elements in the first planetary gear unit 14 are rotate integrally by engaging the first clutch CL1. In addition, the first carrier C1 and the second ring gear R2 are connected by engaging the second clutch CL2. Therefore, the drive torque generated by the engine 11 is delivered to the output member 16 through the second planetary gear unit 15 without being changed. In the ninth mode, the vehicle can be propelled by the synthesized drive torque of the torques of the engine 11, the first motor 12, and the second motor 13. In this case, the first motor 12 is operated as a motor by the power supplied from the battery 33. As a result, the drive torque of the first motor 12 is delivered to the output member 16 through the first planetary gear unit 14 and the second planetary gear unit 15. In this situation, the torque of the first motor 12 is delivered to the output member 16 without being changed. In other words, the drive torques of the engine 11 and the first motor 12 are synthesized by the complex planetary gear unit and delivered to the output member 16. Meanwhile, the drive torque generated by the second motor 13 is synthesized at the driven gear 45 with the drive torques delivered from the engine 11 and the first motor 12. In the ninth mode, therefore, the gear ratio becomes "1", and thus the engine 11 and the output member 16 are always rotated at the same speed. Further, in the ninth mode, the vehicle may be propelled by the drive torques generated by the engine 11 and the second motor 13 while generating the electric power by the first motor 12.

Figure 11:
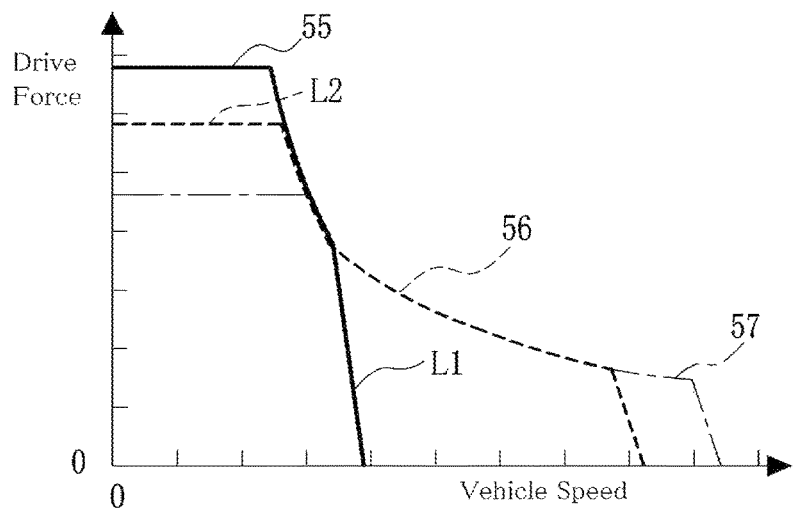
FIG. 11 is a graph indicating an example of an operating region of the third and fourth modes.

FIG. 11 shows operating regions where the vehicle can be propelled in the third mode and the fourth mode. The horizontal axis in FIG. 11 represents the vehicle speed, and the vertical axis represents a drive force (output torque). The drive force is calculated on the basis of a target torque and a required torque governed by an accelerator opening and a driving condition. In the third mode, the vehicle can be propelled at an operating point within a region (hereinafter, denoted as a low-mode region) 55 enclosed by a solid line, and in the fourth mode, can be propelled at an operating point within a region (hereinafter, denoted as a high-mode region) 56 enclosed by a dotted line. The high-mode region 56 includes a vehicle speed higher than that indicated by line L1. That is, in the fourth mode, the drive force can be generated to a speed higher than that in the third mode. This is because, in the third mode, the multiplication factor of the torque delivered from the first motor 12 to the output member 16 is great than that of the fourth mode as described above.

On the other hand, the low-mode region 55 includes the drive force higher than that of line L2. That is, in the low speed range, a greater drive force can be generated in the third mode in comparison with that in the fourth mode. This is because the speed of the first motor 12 with respect to the vehicle speed is lower in the fourth mode than that of the third mode, and hence the drive force can be generated to a higher vehicle speed. Thus, the multiplication factor of the output torque of the first motor 12 can be changed between the third mode and the fourth mode. Therefore, in the dual-motor mode of the drive unit 10, a higher drive force can be generated up to a higher vehicle speed in comparison with the conventional drive unit. In other words, the operating region can be widened. Optionally, in the third mode, the speed ratio may be set in such a manner as to generate the drive force to the higher vehicle speed within a region 57 enclosed by the dashed-dotted line.

Second Embodiment

In a second embodiment, the gear connected to the second carrier C2 is changed from the first ring gear R1 to the first sun gear S1. In the following explanation, common reference numerals are allotted to the elements in common with those of the drive unit 10 in the first embodiment, and detailed explanation for the common elements will be omitted.

According to the second embodiment, specifically, the first ring gear R1 serves as the first rotary element 25 in the drive unit 10 shown in FIG. 1, and the first sun gear S1 serves as the second rotary element 26 in the drive unit 10 shown in FIG. 1. Further, the first carrier C1 serves as the third rotary element 27 in the drive unit 10 shown in FIG. 1, the second carrier C2 serves as the fourth rotary element 28 in the drive unit 10 shown in FIG. 1, the second sun gear S2 serves as the fifth rotary element 29 in the drive unit 10 shown in FIG. 1, and the second ring gear R2 serves as the sixth rotary element 30 in the drive unit 10 shown in FIG. 1.

Specifically, in the second embodiment, the first clutch CL1 is selectively connects the first carrier C1 and the first ring gear R1. Further, the second clutch CL2 selectively connects the first carrier C1 and the second ring gear R2, and the brake BK selectively connects the output shaft 41 (or the input shaft 42) of the engine 11 and the stationary member 32.

Figure 12:
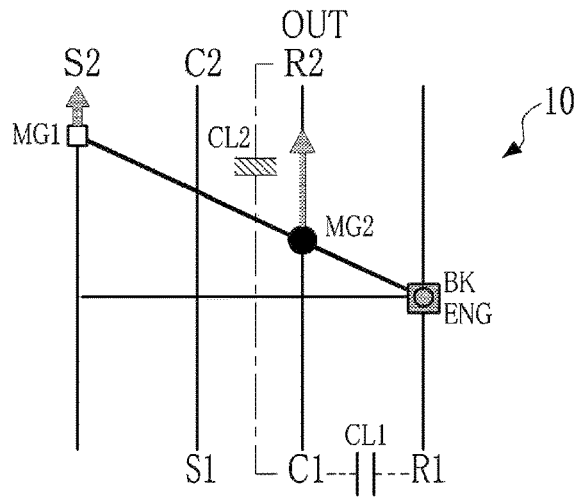
FIG. 12 is a nomographic diagram indicating an operating condition in the third mode of the drive unit of a second embodiment.

In the second embodiment, therefore, the third mode can be established by disengaging the first clutch CL1 while engaging the second clutch CL2 and the brake BK. FIG. 12 indicates an operating condition of the complex planetary gear unit of the drive unit 10 according to the second embodiment in the third mode. As indicated in FIGS. 5 and 12, in the third mode, the operating condition of the complex planetary gear unit according to the first embodiment is similar to that of the complex planetary gear unit according to the second embodiment.

Figure 13:
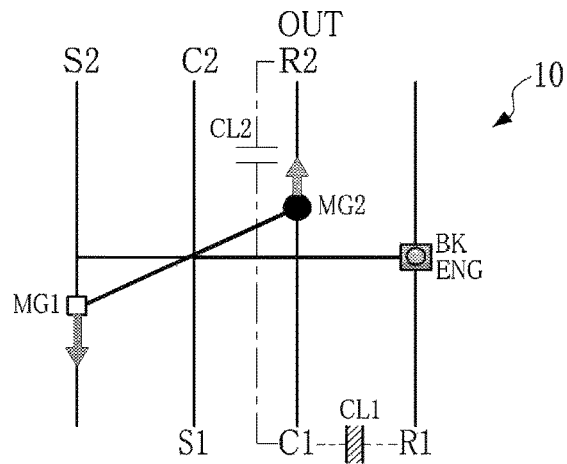
FIG. 13 is a nomographic diagram indicating an operating condition in the fourth mode of the drive unit shown in FIG. 12.

In the second embodiment, the fourth mode can be established by disengaging the second clutch CL2 while engaging the first clutch CL1 and the brake BK. FIG. 13 indicates an operating condition of the complex planetary gear unit of the drive unit 10 according to the second embodiment in the fourth mode. Further, as indicated in FIGS. 6 and 13, in the fourth mode, the operating condition of the complex planetary gear unit of the drive unit 10 according to the first embodiment is similar to that of the complex planetary gear unit of the drive unit 10 according to the second embodiment.

Third Embodiment

In a third embodiment, the gear connected to the second carrier C2 is changed from the first ring gear R1 to the first sun gear S1, and the first carrier C1 and the second sun gear S2 are selectively connected to each other.

Specifically, the first ring gear R1 serves as the first rotary element 25 shown in FIG. 1, the first sun gear S1 serves as the second rotary element 26 shown in FIG. 1, the second ring gear R2 serves as the fifth rotary element 29 shown in FIG. 1, and the second sun gear S2 serves as the sixth rotary element 30 shown in FIG. 1. Further, the first carrier C1 serves as the third rotary element 27 shown in FIG. 1, and the second carrier C2 serves as the fourth rotary element 28 shown in FIG. 1.

In the third embodiment, the second clutch CL2 selectively connects the first carrier C1 and the second sun gear S2. In addition, the first clutch CL1 selectively connects the first sun gear S1 and the first carrier C1, and the brake BK selectively connects the output shaft 41 (or the input shaft 42) of the engine 11 and the stationary member 32.

Figure 14:
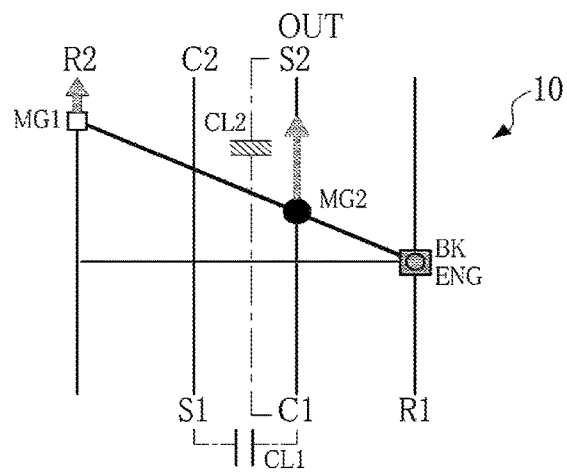
FIG. 14 is a nomographic diagram indicating an operating condition in the third mode of the drive unit of a third embodiment.

In the drive unit 10 according to the third embodiment, the third mode can be set by disengaging the first clutch CL1 while engaging the second clutch CL2 and the brake BK are engaged. FIG. 14 indicates an operating condition of the complex planetary gear of the drive unit 10 according to the third embodiment in the third mode. As indicated in FIGS. 5 and 14, in the third mode, the operating condition of the complex planetary gear unit of the drive unit 10 according to the first embodiment is similar to that of the complex planetary gear unit of the drive unit 10 according to the third embodiment.

Figure 15:
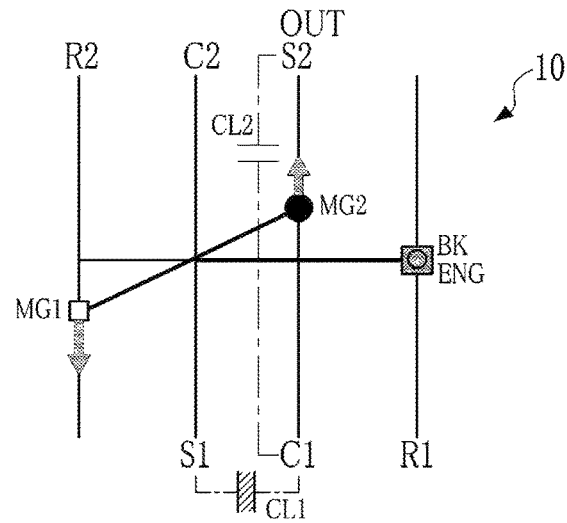
FIG. 15 is a nomographic diagram indicating an operating condition in the fourth mode of the drive unit illustrated in FIG. 14.

In the drive unit 10 according to the third embodiment, the fourth mode can be set by disengaging the second clutch CL2 while engaging the first clutch CL1 and the brake BK. FIG. 15 indicates an operating condition of the complex planetary gear unit of the drive unit 10 according to the third embodiment in the fourth mode. As indicated in FIGS. 6 and 15, in the fourth mode, the operating condition of the complex planetary gear unit of the drive unit 10 according to the first embodiment is similar to that of the complex planetary gear of the drive unit 10 according to the third embodiment.

Fourth Embodiment

In a fourth embodiment, the drive unit 10 the first carrier C1 and the second sun gear S2 are selectively connected to each other. Specifically, the second ring gear R2 serves as the fifth rotary element 29 shown in FIG. 1, and the second sun gear S2 serves as the sixth rotary element 30 shown in FIG. 1.

In the fourth embodiment, the second clutch CL2 selectively connects the first carrier C1 and the second sun gear S2. In addition, the first clutch CL1 selectively connects the first sun gear S1 and the first carrier C1, and the brake BK selectively connects the output shaft 41 (or the input shaft 42) of the engine 11 and the stationary member 32.

Figure 16:
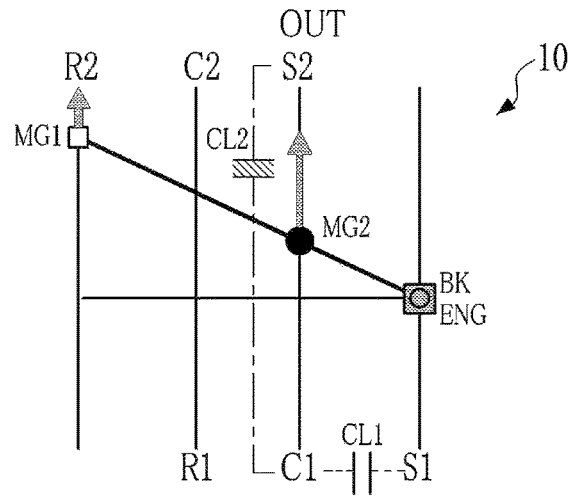
FIG. 16 is a nomographic diagram indicating an operating condition in the third mode of the drive unit of a fourth embodiment.

In the drive unit 10 according to the fourth embodiment, the third mode is established by disengaging the first clutch CL1 while engaging the second clutch CL2 and the brake BK. FIG. 16 indicates an operating condition of the complex planetary gear unit of the drive unit 10 according to the third embodiment in the third mode. As illustrated in FIGS. 5 and 16, in the third mode, the operating condition of the complex planetary gear unit of the drive unit 10 according to the first embodiment is similar to that of the complex planetary gear unit of the drive unit 10 according to the fourth embodiment.

Figure 17:
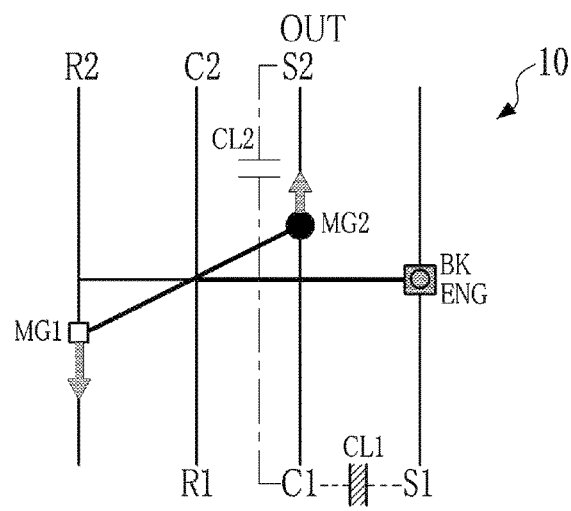
FIG. 17 is a nomographic diagram indicating an operating condition in the fourth mode of the drive unit illustrated in FIG. 16.

In the drive unit 10 according to the fourth embodiment, the fourth mode is established by disengaging the second clutch CL2 while engaging the first clutch CL1 and the brake BK. FIG. 17 indicates the operating condition of the complex planetary gear of the drive unit 10 according to the fourth embodiment in the fourth mode. As indicated in FIGS. 6 and 17, in the fourth mode, the operating condition of the complex planetary gear unit of the drive unit 10 according to the first embodiment is similar to that of the complex planetary gear unit of the drive unit 10 according to the fourth embodiment.

Fifth Embodiment

Figure 18:
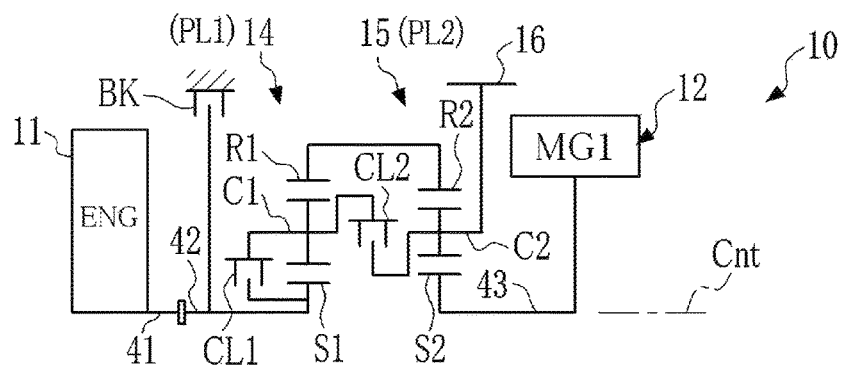
FIG. 18 is a skeleton diagram indicating the drive unit of a fifth embodiment.

FIG. 18 is a skeleton diagram showing the drive unit 10 according to a fifth embodiment. In the drive unit 10 according to the fifth embodiment, the first ring gear R1 and the second ring gear R2 are connected to each other, and the first carrier C1 and the second carrier C2 are selectively connected to each other. Specifically, the second ring gear R2 serves as the fourth rotary element 28 shown in FIG. 1, and the second sun gear S2 serves as the fifth rotary element 29 shown in FIG. 1. Further, the first sun gear S1 serves as the first rotary element 25 shown in FIG. 1, the first ring gear R1 serves as the second rotary element 26 shown in FIG. 1, the first carrier C1 serves as the third rotary element 27 shown in FIG. 1, and the second carrier C2 serves as the sixth rotary element 30 as shown in FIG. 1.

In the fifth embodiment, the second clutch CL2 selectively connects the first carrier C1 and the second carrier C2. In addition, the first clutch CL1 selectively connects the first sun gear S1 and the first carrier C1, and the brake BK selectively connects the output shaft 41 (or the input shaft 42) of the engine 11 and the stationary member 32.

In the drive unit 10 shown in FIG. 18, a power transmission system from the output member 16 to the drive wheel 53 including the second motor 13 is similar to that of the drive unit 10 shown in FIG. 2, and hence detailed explanation therefore will be omitted. Further, the drive unit 10 according to the fifth embodiment is arranged symmetrically about the same axial line Cnt as the output shaft 41 of the engine 11, and thus the lower half portion of the axial line Cnt is omitted in FIG. 18.

FIG. 19 is a table indicating the operating modes selectable in the drive unit 10 shown in FIG. 18. The operating mode of the drive unit 10 can be shifted among the first mode to the ninth mode by manipulating the first clutch CL1, the second clutch CL2, the brake BK, the engine 11, the first motor 12, and the second motor 13 by the HV_ECU 22.

FIG. 20 indicates an operating condition of the complex planetary gear unit of the drive unit 10 shown in FIG. 18 in the first mode.

In the drive unit 10 illustrated in FIG. 18, the first mode is established by disengaging all of the first clutch CL1, the second clutch CL2, and the brake BK. In the first mode, the engine 11 and the first motor 12 are stopped, and the second motor 13 serves as a motor. As indicated in FIG. 20, in the first mode, the operating condition of the complex planetary gear unit of the drive unit 10 shown in FIG. 18 is similar to that of the complex planetary gear unit of the drive unit 10 shown in FIG. 2, and hence the detailed description herein will be omitted.

FIG. 21 indicates the operating condition of the complex planetary gear unit of the drive unit 10 shown in FIG. 18 in the third mode. In the drive unit 10 shown in FIG. 18, the third mode is established by engaging the first clutch CL1 and the brake BK while disengaging the second clutch CL2. In the third mode, the engine 11 is stopped, and the first motor 12 and the second motor 13 serve as a motor. As indicated in FIG. 21, in the third mode, the operating condition of the complex planetary gear unit of the drive unit 10 shown in FIG. 18 is similar to that of the complex planetary gear unit of the drive unit 10 shown in FIG. 2, and hence the detailed description herein will be omitted.

Figure 22:
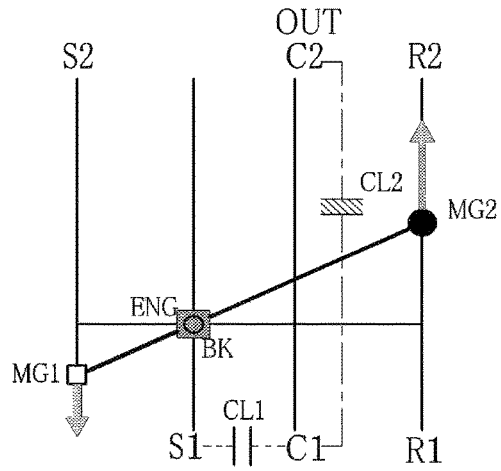
FIG. 22 is a nomographic diagram indicating an operating condition in the fourth mode shown in FIG. 19.

FIG. 22 indicates the operating condition of the complex planetary gear unit of the drive unit 10 shown in FIG. 18 in the fourth mode. In the drive unit 10 shown in FIG. 18, the fourth mode is established by engaging the second clutch CL2 and the brake BK while disengaging the first clutch CL1. In the fourth mode, specifically, the engine 11 is stopped, and the first motor 12 and the second motor 13 serve as a motor. As indicated in FIG. 22, in the fourth mode, the operating condition of the complex planetary gear unit of the drive unit 10 shown in FIG. 18 is similar to that of the complex planetary gear unit of the drive unit 10 shown in FIG. 2, and hence the detailed description herein will be omitted.

Figure 23:
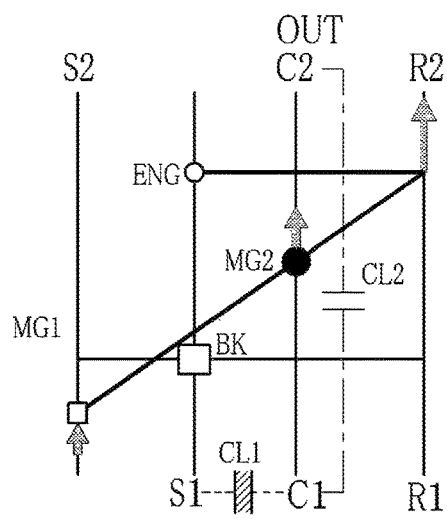
FIG. 23 is a nomographic diagram indicating an operating condition in the fifth mode shown in FIG. 19.

FIG. 23 indicates the operating condition of the complex planetary gear unit of the drive unit 10 shown in FIG. 18 in the fifth mode. In the drive unit 10 shown in FIG. 18, the fifth mode is established by engaging the first clutch CL1 while disengaging the brake BK and the second clutch CL2. In the fifth mode, specifically, the engine 11 is operated, the first motor 12 serves as a generator, and the second motor 13 serves as a motor. As indicated in FIG. 23, in the fifth mode, the operating condition of the complex planetary gear unit of the drive unit 10 shown in FIG. 18 is similar to that of the complex planetary gear unit of the drive unit 10 shown in FIG. 2, and hence the detailed description herein will be omitted.

Figure 24:
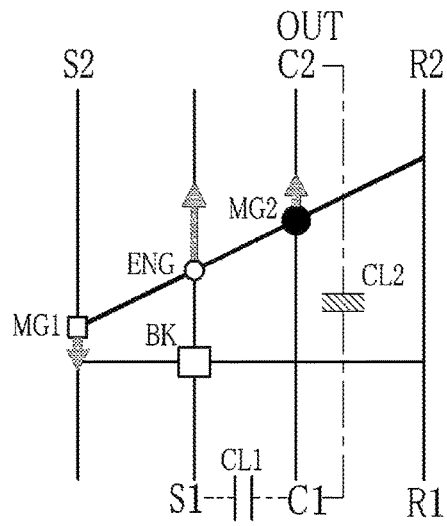
FIG. 24 is a nomographic diagram indicating an operating condition in the seventh mode shown in FIG. 19.

FIG. 24 indicates the operating condition of the complex planetary gear unit of the drive unit 10 shown in FIG. 18 in the seventh mode. In the drive unit 10 shown in FIG. 18, the seventh mode is established by disengaging the first clutch CL1 and the brake BK while engaging the second clutch CL2. In the seventh mode, the engine 11 is operated, the first motor 12 serves as a generator, and the second motor 13 serves as a motor. As indicated in FIG. 24, the operating condition of the complex planetary gear unit of the drive unit 10 shown in FIG. 18 is similar to that of the complex planetary gear unit of the drive unit 10 shown in FIG. 2, and hence the detailed description herein will be omitted.

Figure 25:
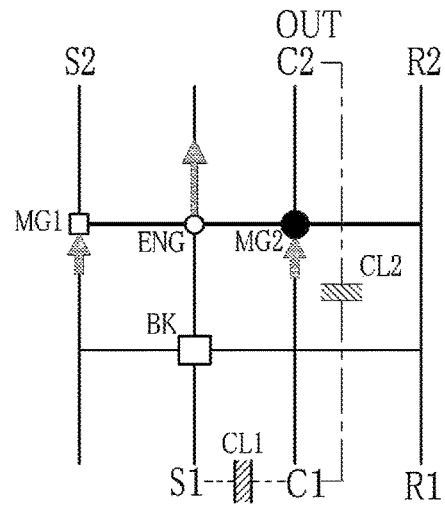
FIG. 25 is a nomographic diagram indicating an operating condition of the ninth mode shown in FIG. 19.

FIG. 25 indicates the operating condition of the complex planetary gear unit of the drive unit 10 shown in FIG. 18 in the ninth mode. In the drive unit 10 shown in FIG. 18, the ninth mode is established by engaging the first clutch CL1 and the second clutch CL2 while disengaging the brake BK. In the ninth mode, the engine 11 is operated, and the first motor 12 and the second motor 13 serve as a motor. As indicated in FIG. 25, in the ninth mode, the operating condition of the complex planetary gear unit of the drive unit 10 shown in FIG. 18 is similar to that of the complex planetary gear unit shown in FIG. 2, and hence the detailed description herein will be omitted.

Sixth Embodiment

In the drive unit 10 according to a sixth embodiment, the first ring gear R1 in the fifth embodiment is connected to the engine 11, and the first ring gear R1 and the first carrier C1 are selectively connected. In other words, in the sixth embodiment, the first ring gear R1 serves as the first rotary element 25 shown in FIG. 1, the first sun gear S1 serves as the second rotary element 26 shown in FIG. 1, the first carrier C1 serves as the third rotary element 27 shown in FIG. 1, the second ring gear R2 serves as the fourth rotary element 28 shown in FIG. 1, the second sun gear S2 serves as the fifth rotary element 29 shown in FIG. 1, and the second carrier C2 serves as the sixth rotary element 30 shown in FIG. 1.

In the sixth embodiment, the first clutch CL1 selectively connects the first carrier C1 and the first ring gear R1. In addition, the second clutch CL2 selectively connects the first carrier C1 and the second carrier C2, and the brake BK selectively connects the output shaft 41 and the stationary member 32.

Figure 26:
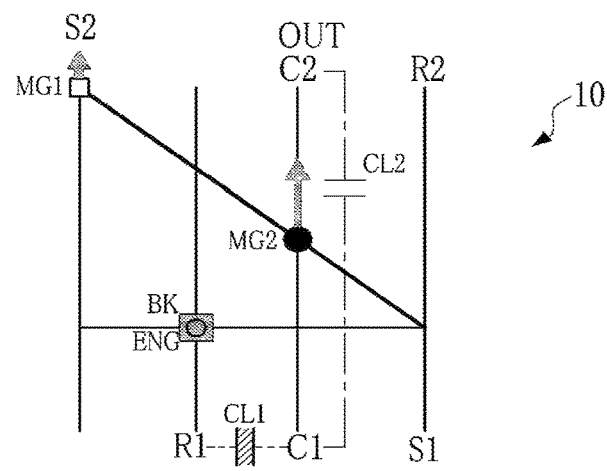
FIG. 26 is a nomographic diagram indicating an operating condition in the third mode of the drive unit of a sixth embodiment.

In the drive unit 10 according to the sixth embodiment, therefore, the third mode is established by engaging the first clutch CL1 and the brake BK while disengaging the second clutch CL2. FIG. 26 indicates the operating condition of the complex planetary gear of the drive unit 10 according to the sixth embodiment in the third mode. As indicated in FIGS. 21 and 26, in the third mode, the operating condition of the complex planetary gear unit of the drive unit 10 according to the fifth embodiment is similar to that of the complex planetary gear unit of the drive unit 10 according to the sixth embodiment.

Figure 27:
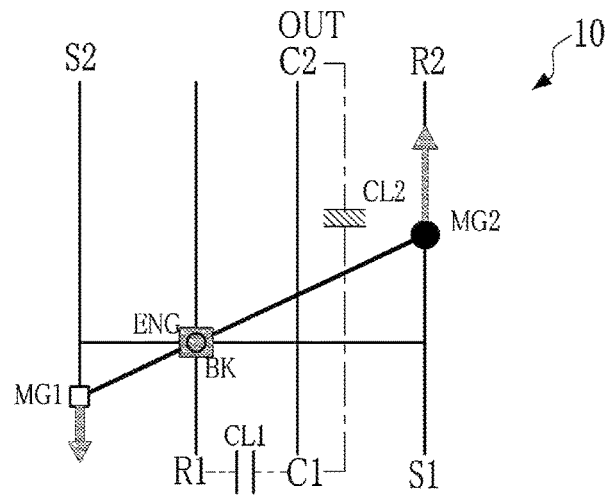
FIG. 27 is a nomographic diagram indicating an operating condition in the fourth mode of the drive unit illustrated in FIG. 26.

In the drive unit 10 according to the sixth embodiment, the fourth mode is established by engaging the second clutch CL2 and the brake BK while disengaging the first clutch CL1. FIG. 27 indicates the operating condition of the complex planetary gear unit of the drive unit 10 according to the sixth embodiment in the fourth mode. As indicated in FIGS. 22 and 27, in the fourth mode, the operating condition of the complex planetary gear unit of the drive unit 10 according to the sixth embodiment is similar to that of the complex planetary gear unit of the drive unit 10 according to the fifth embodiment.

Seventh Embodiment

In a seventh embodiment, the first sun gear S1 and the second sun gear S2 in the fifth embodiment are connected, the first ring gear R1 is connected to the engine, and the first ring gear R1 and the first carrier C1 are selectively connected. In other words, in the seventh embodiment, the first ring gear R1 serves as the first rotary element 25 shown in FIG. 1, the first sun gear S1 serves as the second rotary element 26 shown in FIG. 1, the first carrier C1 serves as the third rotary element 27 shown in FIG. 1, the second sun gear S2 serves as the fourth rotary element 28 shown in FIG. 1, the second ring gear R2 serves as the fifth rotary element 29 shown in FIG. 1, and the second carrier C2 serves as the sixth rotary element 30 shown in FIG. 1.

In the seventh embodiment, the first clutch CL1 selectively connects the first carrier C1 and the first ring gear R1. In addition, the second clutch CL2 selectively connects the first carrier C1 and the second carrier C2, and the brake BK selectively connects the output shaft 41 and the stationary member 32.

Figure 28:
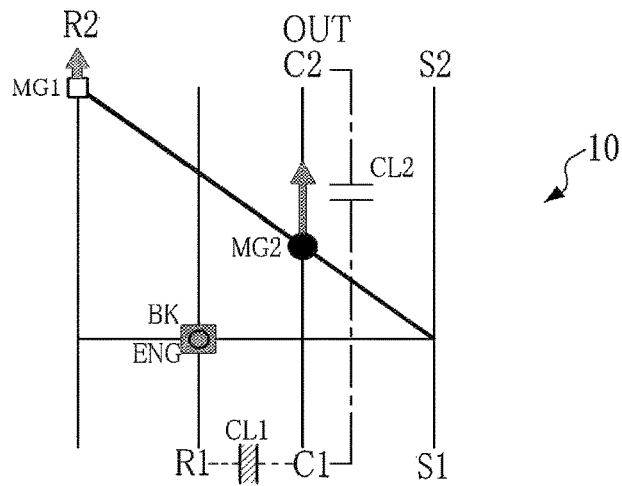
FIG. 28 is a nomographic diagram indicating an operating condition in the third mode of the drive unit of a seventh embodiment.

In the drive unit 10 according to the seventh embodiment, the third mode is established by engaging the first clutch CL1 and the brake BK while disengaging the second clutch CL2. FIG. 28 indicates the operating condition of the complex planetary gear unit of the drive unit 10 according to the seventh embodiment in the third mode. As indicated in FIGS. 21 and 28, in the third mode, the operating condition of the complex planetary gear unit of the drive unit 10 according to the fifth embodiment is similar to that of the complex planetary gear unit of the drive unit 10 according to the seventh embodiment.

Figure 29:
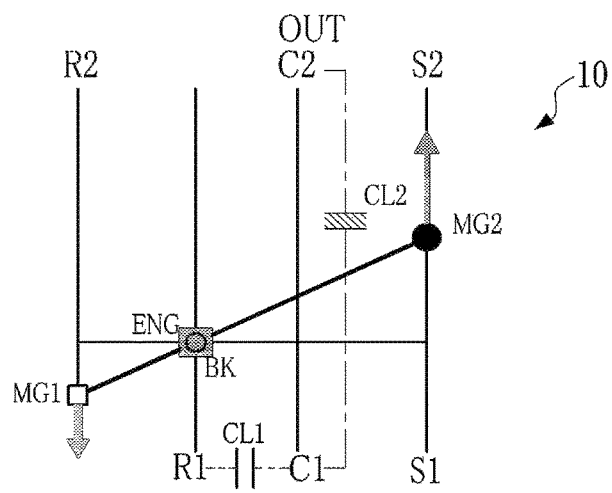
FIG. 29 is a nomographic diagram indicating an operating condition in the fourth mode of the drive unit illustrated in FIG. 28.

In the drive unit 10 according to the seventh embodiment, the fourth mode is established by engaging the second clutch CL2 and the brake BK while disengaging the first clutch CL1. FIG. 29 indicates the operating condition of the complex planetary gear unit of the drive unit 10 according to the seventh embodiment in the fourth mode. As illustrated in FIGS. 22 and 29, in the fourth mode, the operating condition of the complex planetary gear unit of the drive unit 10 according to the seventh embodiment is similar to that of the complex planetary gear unit of the drive unit 10 according to the fifth embodiment.

Eighth Embodiment

In an eighth embodiment, the first ring gear R1 and the second sun gear S2 in the fifth embodiment are connected to each other. In other words, in the eighth embodiment, the first sun gear S1 serves as the first rotary element 25 shown in FIG. 1, the first ring gear R1 serves as the second rotary element 26 shown in FIG. 1, the first carrier C1 serves as the third rotary element 27 shown in FIG. 1, the second sun gear S2 serves as the fourth rotary element 28 shown in FIG. 1, the second ring gear R2 serves as the fifth rotary element 29 shown in FIG. 1, and the second carrier C2 serves as the sixth rotary element 30 shown in FIG. 1.

Further, in the eighth embodiment, the first clutch CL1 selectively connects the first sun gear S1 and the first carrier C1, the second clutch CL2 selectively connects the first carrier C1 and the second carrier C2, and the brake BK selectively connects the output shaft 41 and the stationary member 32.

Figure 30:
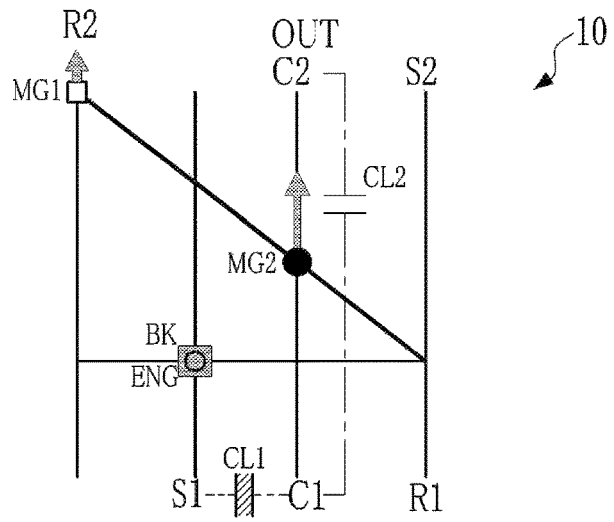
FIG. 30 is a nomographic diagram indicating an operating condition in the third mode of the drive unit of an eighth embodiment.

Therefore, the drive unit 10 in the eighth embodiment can set the third mode such that the second clutch CL2 is disengaged, and the first clutch CL1 and the brake BK are engaged. FIG. 30 indicates the operating condition of the complex planetary gear unit in a case where the drive unit 10 in the eighth embodiment sets the third mode. Further, as illustrated in FIGS. 21 and 30, the operating condition of the complex planetary gear unit in a case where the drive unit 10 in the fifth embodiment sets the third mode is similar to the operating condition of the complex planetary gear unit in a case where the drive unit 10 in the eighth embodiment sets the third mode.

Figure 31:
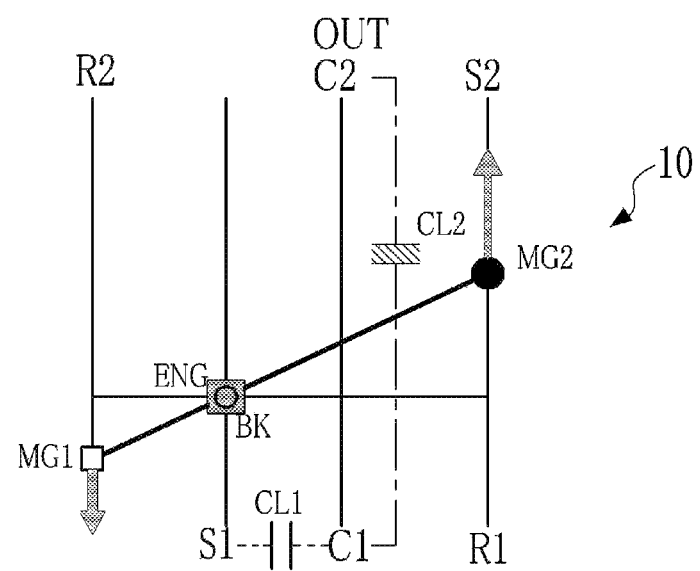
FIG. 31 is a nomographic diagram indicating an operating condition in the fourth mode of the drive unit illustrated in FIG. 30.

In the drive unit 10 according to the eighth embodiment, the fourth mode is established by engaging the second clutch CL2 and the brake BK while disengaging the first clutch CL1. FIG. 31 indicates the operating condition of the complex planetary gear unit of the drive unit 10 according to the eighth embodiment in the fourth mode. As indicated in FIGS. 22 and 31, in the fourth mode, the operating condition of the complex planetary gear unit of the drive unit 10 according to the eighth embodiment is similar to that of the complex planetary gear unit of the drive unit 10 according to in the fifth embodiment.

Figure 32:
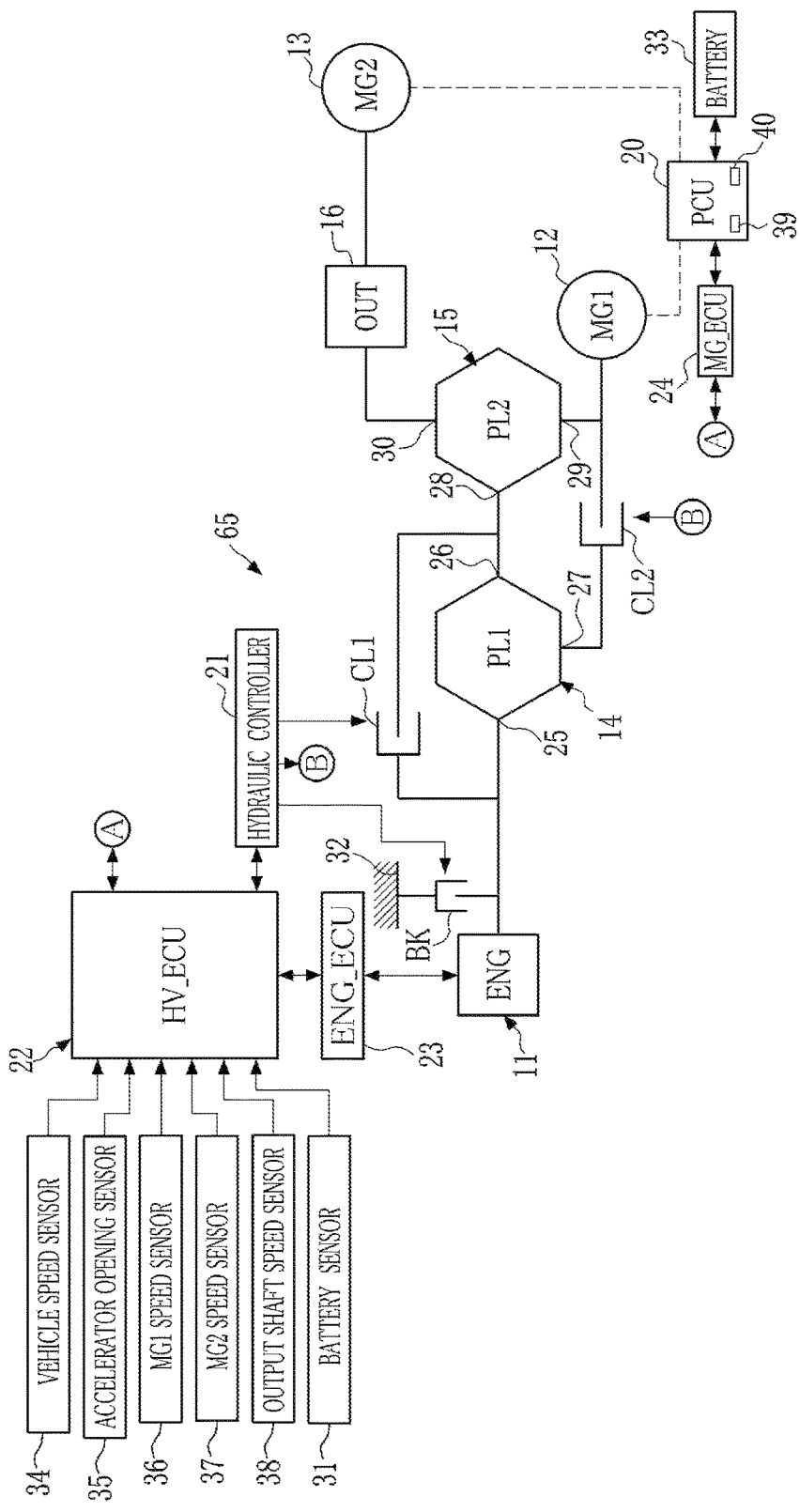
FIG. 32 is a block diagram conceptually indicating the drive unit of another embodiment of the disclosure.

FIG. 32 conceptually illustrates a drive unit 65 of the ninth to sixteenth embodiments to be described below. The drive unit 65 illustrated in FIG. 32 is different from the drive unit 10 illustrated in FIG. 1, in which the second clutch CL2 selectively connects the third rotary element 27 and the fifth rotary element 29.

Ninth Embodiment

Figure 33:
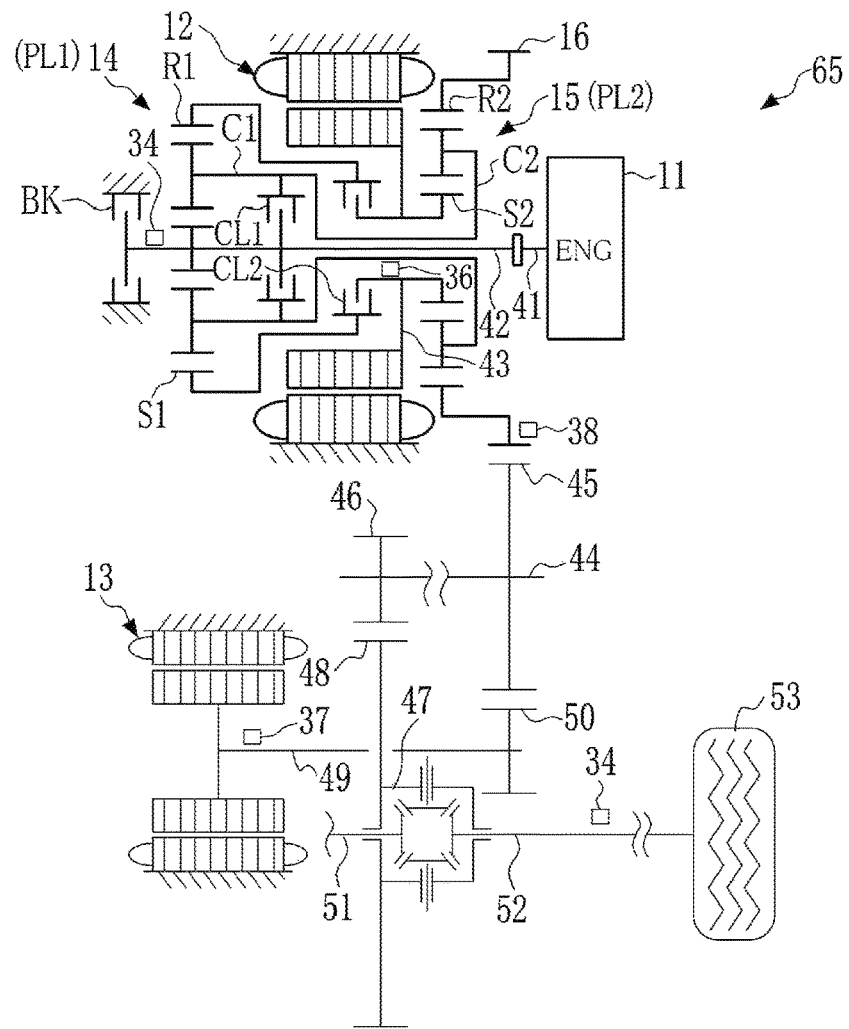
FIG. 33 is a skeleton diagram indicating the drive unit of a ninth embodiment.

FIG. 33 illustrates a skeleton diagram of the drive unit 65 in the ninth embodiment. In the ninth embodiment, the first sun gear S1 serves as the first rotary element 25 shown in FIG. 32, the first carrier C1 serves as the second rotary element 26 shown in FIG. 32, the first ring gear R1 serves as the third rotary element 27 shown in FIG. 32, the second carrier C2 serves as the fourth rotary element 28 shown in FIG. 32, the second sun gear S2 serves as the fifth rotary element 29 shown in FIG. 32, and the second ring gear R2 serves as the sixth rotary element 30 shown in FIG. 32.

In the drive unit 65 according to the ninth embodiment, the first clutch CL1 selectively connects the first sun gear S1 and the first carrier C1, and the second clutch CL2 selectively connects the first ring gear R1 and the second sun gear S2. In addition, the brake BK selectively connects the output shaft 41 and the stationary member 32.

The operating modes available in the drive unit 65 according to the ninth embodiment are similar to the first to ninth modes shown in FIG. 3. In addition, the engagement state of the first clutch CL1, the second clutch CL2, and the brake BK for setting the first to ninth modes is also similar to the example shown in FIG. 3.

Figure 34:
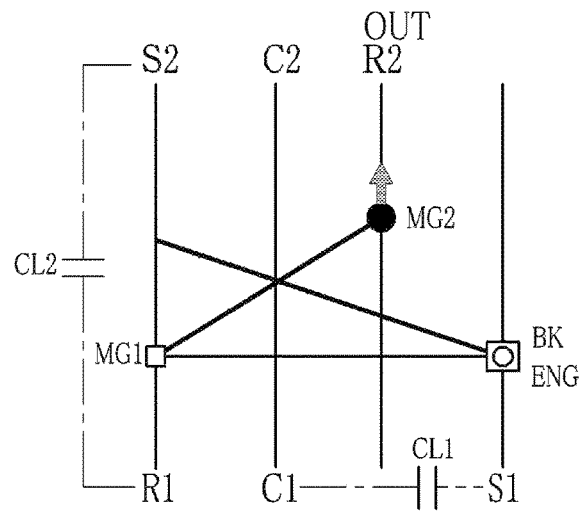
FIG. 34 is a nomographic diagram indicating an operating condition in the first mode of the drive unit illustrated in FIG. 33.

FIG. 34 indicates the operating condition of the complex planetary gear unit of the drive unit 65 shown in FIG. 33 in the first mode.

As indicated in FIGS. 4 and 34, in the first mode, the operating condition of the complex planetary gear unit of the drive unit 65 shown in FIG. 33 is similar to that of the complex planetary gear unit of the drive unit 10 shown in FIG. 2.

Figure 35:
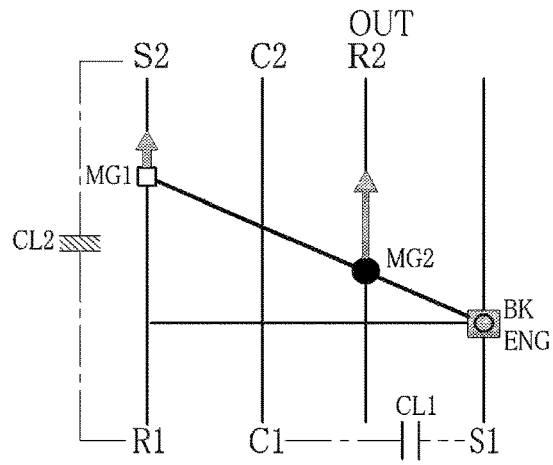
FIG. 35 is a nomographic diagram indicating an operating condition in the third mode of the drive unit illustrated in FIG. 33.

FIG. 35 indicates the operating condition of the complex planetary gear unit of the drive unit 65 illustrated in FIG. 33 in the third mode. As illustrated in FIGS. 5 and 35, in the third mode, the operating condition of the complex planetary gear unit of the drive unit 65 illustrated in FIG. 33 is similar to that of the complex planetary gear unit of the drive unit 10 illustrated in FIG. 2.

Figure 36:
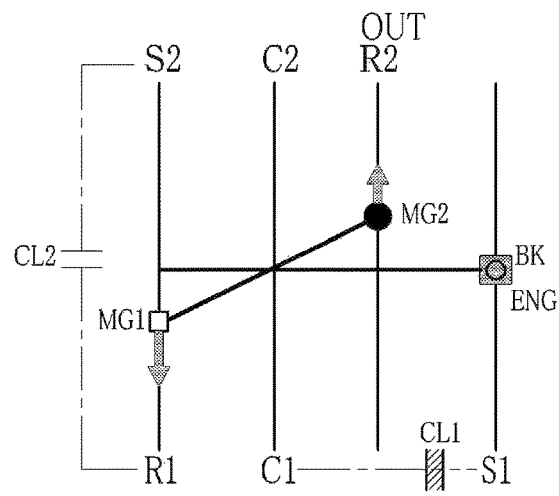
FIG. 36 is a nomographic diagram indicating an operating condition in the fourth mode of the drive unit illustrated in FIG. 33.

FIG. 36 indicates the operating condition of the complex planetary gear unit of the drive unit 65 illustrated in FIG. 33 in the fourth mode. As indicated in FIGS. 6 and 36, in the fourth mode, the operating condition of the complex planetary gear unit of the drive unit 65 illustrated in FIG. 33 is similar to that of the complex planetary gear unit of the drive unit 10 illustrated in FIG. 2.

Figure 37:
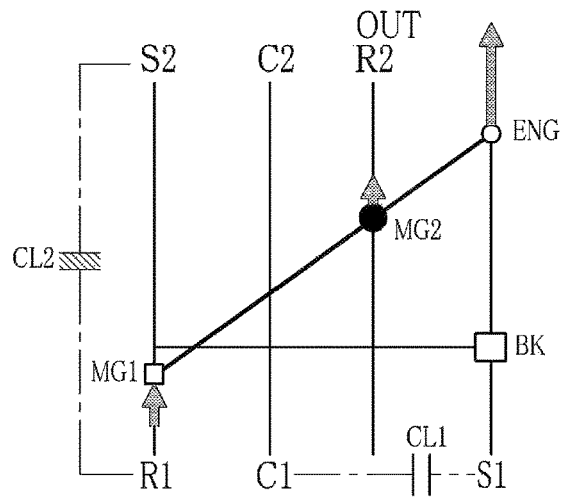
FIG. 37 is a nomographic diagram indicating an operating condition in the fifth mode of the drive unit illustrated in FIG. 33.

FIG. 37 indicates the operating condition of the complex planetary gear unit of the drive unit 65 illustrated in FIG. 33 in the fifth mode. As illustrated in FIGS. 7 and 37, in the fifth mode, the operating condition of the complex planetary gear unit of the drive unit 65 illustrated in FIG. 33 is similar to that of the complex planetary gear unit of the drive unit 10 illustrated in FIG. 2.

Figure 38:
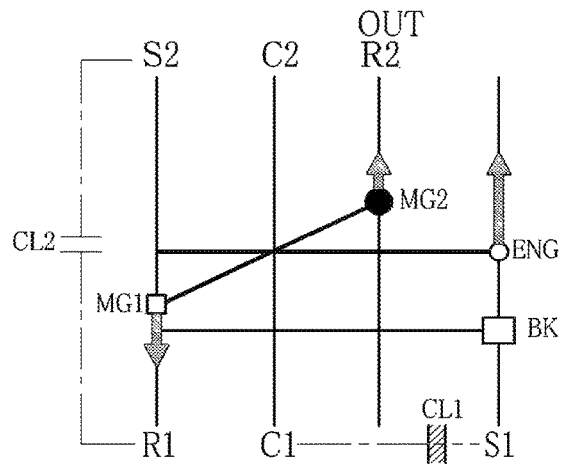
FIG. 38 is a nomographic diagram indicating an operating condition in the seventh mode of the drive unit illustrated in FIG. 33.

FIG. 38 indicates the operating condition of the complex planetary gear unit of the drive unit 65 illustrated in FIG. 33 in the seventh mode. As illustrated in FIGS. 8 and 38, in the seventh mode, the operating condition of the complex planetary gear unit of the drive unit 65 illustrated in FIG. 33 is similar to that of the complex planetary gear unit of the drive unit 10 illustrated in FIG. 2.

Figure 39:
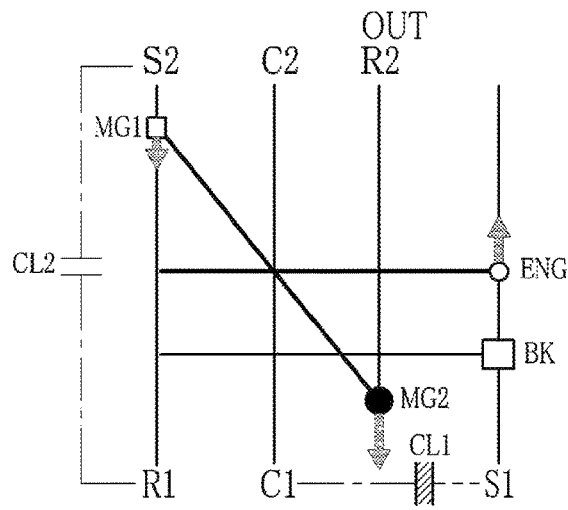
FIG. 39 is a nomographic diagram indicating an operating condition in the eighth mode of the drive unit illustrated in FIG. 33.

FIG. 39 indicates the operating condition of the complex planetary gear unit of the drive unit 65 illustrated in FIG. 33 in the eighth mode. As illustrated in FIGS. 9 and 39, in the eighth mode, the operating condition of the complex planetary gear unit of the drive unit 65 illustrated in FIG. 33 is similar to that of the operating condition of the complex planetary gear unit of the drive unit 10 illustrated in FIG. 2.

Figure 40:
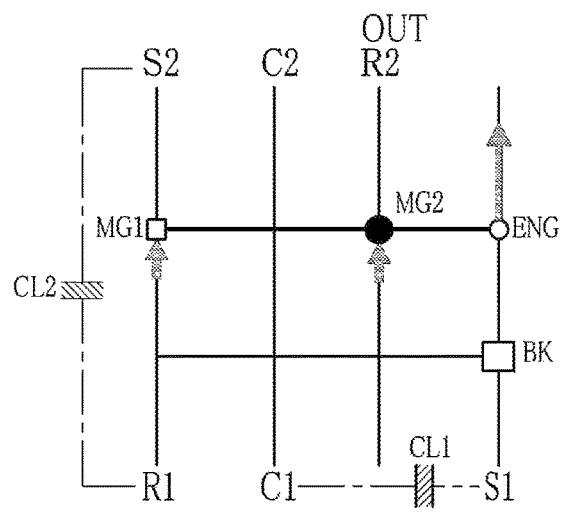
FIG. 40 is a nomographic diagram indicating an operating condition in the ninth mode of the drive unit illustrated in FIG. 33.

FIG. 40 indicates the operating condition of the complex planetary gear unit of the drive unit 65 illustrated in FIG. 33 in the ninth mode. As illustrated in FIGS. 10 and 40, in the ninth mode set, the operating condition of the complex planetary gear unit of the drive unit 65 illustrated in FIG. 33 is similar to that of the complex planetary gear unit of the drive unit 10 illustrated in FIG. 2.

Tenth Embodiment

In a tenth embodiment, the first sun gear S1 and the second carrier C2 in the ninth embodiment are connected, the first carrier C1 and the second ring gear R2 are selectively connected, and the first carrier C1 and the first ring gear R1 are selectively connected. In other words, the first ring gear R1 serves as the first rotary element 25 shown in FIG. 32, the first sun gear S1 serves as the second rotary element 26 shown in FIG. 32, the first carrier C1 serves as the third rotary element 27 shown in FIG. 32, the second carrier C2 serves as the fourth rotary element 28 shown in FIG. 32, the second sun gear S2 serves as the fifth rotary element 29 shown in FIG. 32, and the second ring gear R2 serves as the sixth rotary element 30 shown in FIG. 32.

In the tenth embodiment, the first clutch CL1 selectively connects the first ring gear R1 and the first carrier C1, the second clutch CL2 selectively connects the first carrier C1 and the second ring gear R2, and the brake BK selectively connects the output shaft 41 and the stationary member 32.

Figure 41:
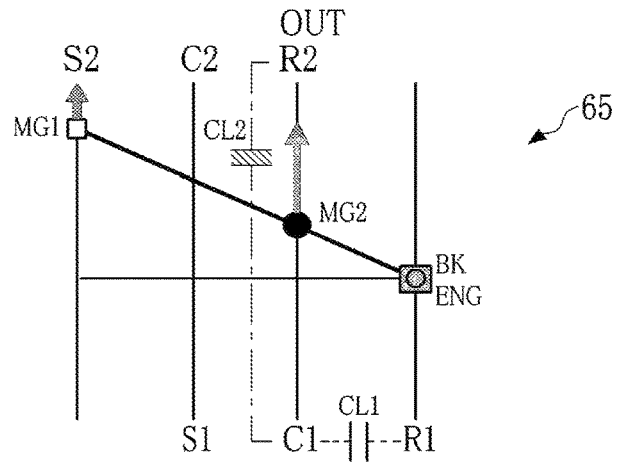
FIG. 41 is a nomographic diagram indicating an operating condition in the third mode of the drive unit of a tenth embodiment.

In the drive unit 65 according to the tenth embodiment, the third mode is established by disengaging the first clutch CL1 while engaging the second clutch CL2 and the brake BK. FIG. 41 indicates an operating condition of the complex planetary gear unit of the drive unit 65 according to the tenth embodiment in the third mode. As illustrated in FIGS. 5 and 41, in the third mode the operating condition of the complex planetary gear unit of the drive unit 65 according to the tenth embodiment is similar to that of the complex planetary gear unit of the drive unit 10 illustrated in FIG. 2.

Figure 42:
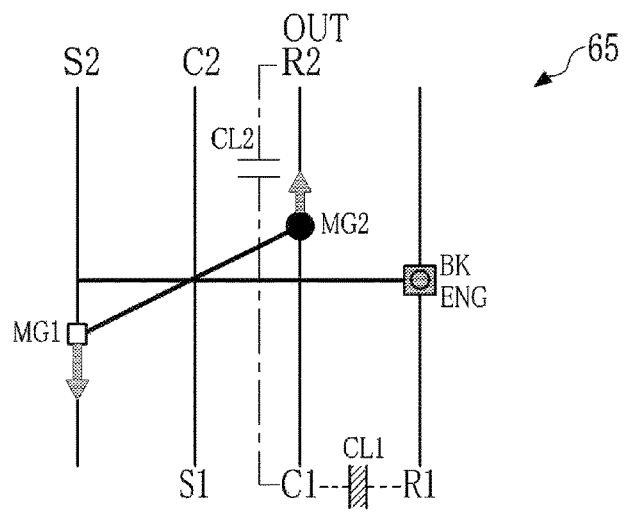
FIG. 42 is a nomographic diagram indicating an operating condition in the fourth mode of the drive unit illustrated in FIG. 41.

In the drive unit 65 according to the tenth embodiment, the fourth mode is established by disengaging the second clutch CL2 while engaging the first clutch CL1 and the brake BK. FIG. 42 indicates the operating condition of the complex planetary gear unit of the drive unit 65 according to the tenth embodiment in the fourth mode. As illustrated in FIGS. 6 and 42, in the fourth mode, the operating condition of the complex planetary gear unit of the drive unit 65 according to the tenth embodiment is similar to that of the complex planetary gear unit of the drive unit 10 illustrated in FIG. 2.

Eleventh Embodiment

In an eleventh embodiment, the first sun gear S1 and the second carrier C2 in the ninth embodiment are connected, the first carrier C1 and the second sun gear S2 are selectively connected, and the first carrier C1 and the first ring gear R1 are selectively connected.

In other words, the first ring gear R1 serves as the first rotary element 25 shown in FIG. 32, the first sun gear S1 serves as the second rotary element 26 shown in FIG. 32, the first carrier C1 serves as the third rotary element 27 shown in FIG. 32, the second carrier C2 serves as the fourth rotary element 28 shown in FIG. 32, the second ring gear R2 serves as the fifth rotary element 29 shown in FIG. 32, and the second sun gear S2 serves as the sixth rotary element 30 shown in FIG. 32.

In the eleventh embodiment, therefore, the first clutch CL1 selectively connects the first carrier C1 and the first ring gear R1, the second clutch CL2 selectively connects the first carrier C1 and the second sun gear S2, and the brake BK selectively connects the output shaft 41 and the stationary member 32.

Figure 43:
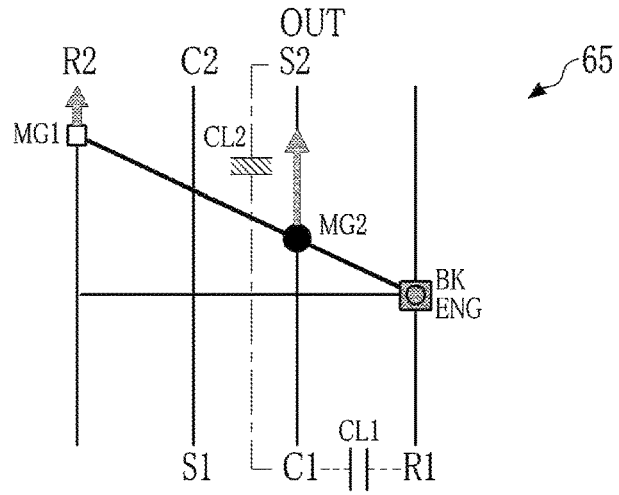
FIG. 43 is a nomographic diagram indicating an operating condition in the third mode of the drive unit of an eleventh embodiment.

In the drive unit 65 according to the eleventh embodiment, the third mode is established by disengaging the first clutch CL1 while engaging the second clutch CL2 and the brake BK. FIG. 43 indicates the operating condition of the complex planetary gear unit of the drive unit 65 according to the eleventh embodiment in the third mode. As illustrated in FIGS. 5 and 43, in the third mode, the operating condition of the complex planetary gear unit of the drive unit 65 according to the eleventh embodiment is similar to that of the complex planetary gear unit of the drive unit 10 illustrated in FIG. 2.

Figure 44:
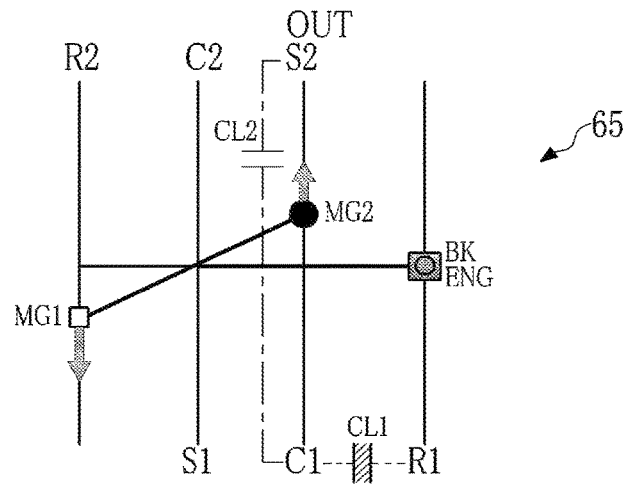
FIG. 44 is a nomographic diagram indicating an operating condition in the fourth mode of the drive unit illustrated in FIG. 43.

In the drive unit 65 according to the eleventh embodiment, the fourth mode is established by disengaging the second clutch CL2 while engaging the first clutch CL1 and the brake BK. FIG. 44 indicates the operating condition of the complex planetary gear unit of the drive unit 65 according to the eleventh embodiment in the fourth mode. As illustrated in FIGS. 6 and 44, in the fourth mode, the operating condition of the complex planetary gear unit of the drive unit 65 according to the eleventh embodiment is similar to that of the complex planetary gear unit of the drive unit 10 illustrated in FIG. 2.

Twelfth Embodiment

In a twelfth embodiment, the first ring gear R1 and the second carrier C2 in the ninth embodiment are connected, the first carrier C1 and the second sun gear S2 are selectively connected, and the first sun gear S1 and the first carrier C1 are selectively connected.

In other words, the first sun gear S1 serves as the first rotary element 25 shown in FIG. 32, the first ring gear R1 serves as the second rotary element 26 shown in FIG. 32, the first carrier C1 serves as the third rotary element 27 shown in FIG. 32, the second carrier C2 serves as the fourth rotary element 28 shown in FIG. 32, the second ring gear R2 serves as the fifth rotary element 29 shown in FIG. 32, and the second sun gear S2 serves as the sixth rotary element 30 shown in FIG. 32.

In the twelfth embodiment, therefore, the first clutch CL1 selectively connects the first sun gear S1 and the first carrier C1, the second clutch CL2 selectively connects the first carrier C1 and the second sun gear S2, and the brake BK selectively connects the output shaft 41 and the stationary member 32.

Figure 45:
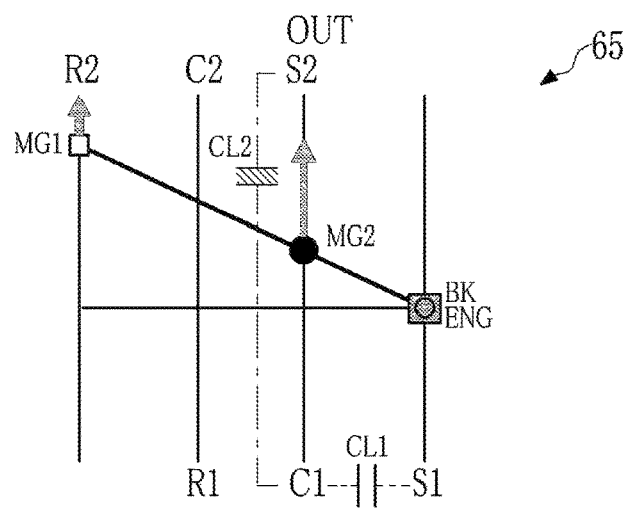
FIG. 45 is a nomographic diagram indicating an operating condition in the third mode of the drive unit of a twelfth embodiment.

In the drive unit 65 according to the eleventh embodiment, the third mode is established by disengaging the first clutch CL1 while engaging the second clutch CL2 and the brake BK. FIG. 45 indicates the operating condition of the complex planetary gear unit of the drive unit 65 according to the twelfth embodiment in the third mode. As illustrated in FIGS. 5 and 45, in the third mode, the operating condition of the complex planetary gear unit of the drive unit 65 according to the twelfth embodiment is similar to that of the complex planetary gear unit of the drive unit 10 illustrated in FIG. 2.

Figure 46:
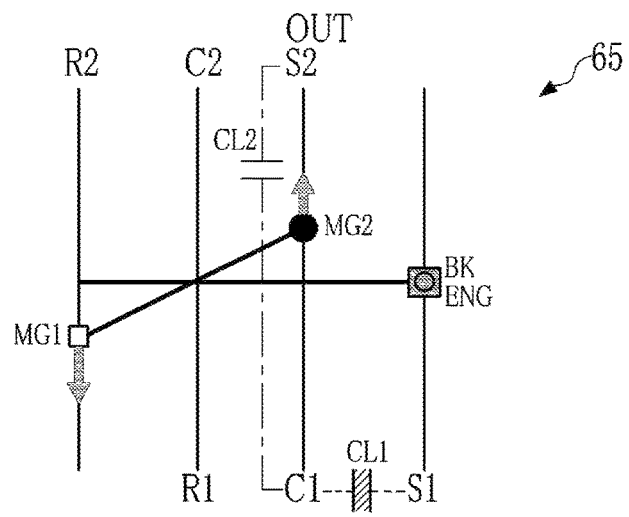
FIG. 46 is a nomographic diagram indicating an operating condition in the fourth mode of the drive unit illustrated in FIG. 45.

In the drive unit 65 according the twelfth embodiment, the fourth mode is established by disengaging the second clutch CL2 while engaging the first clutch CL1 and the brake BK. FIG. 46 indicates the operating condition of the complex planetary gear unit of the drive unit 65 according to the twelfth embodiment in the fourth mode. As illustrated in FIGS. 6 and 46, in the fourth mode, the operating condition of the complex planetary gear unit of the drive unit 65 according to the twelfth embodiment is similar to that of the complex planetary gear unit of the drive unit 10 illustrated in FIG. 2.

Thirteenth Embodiment

Figure 47:
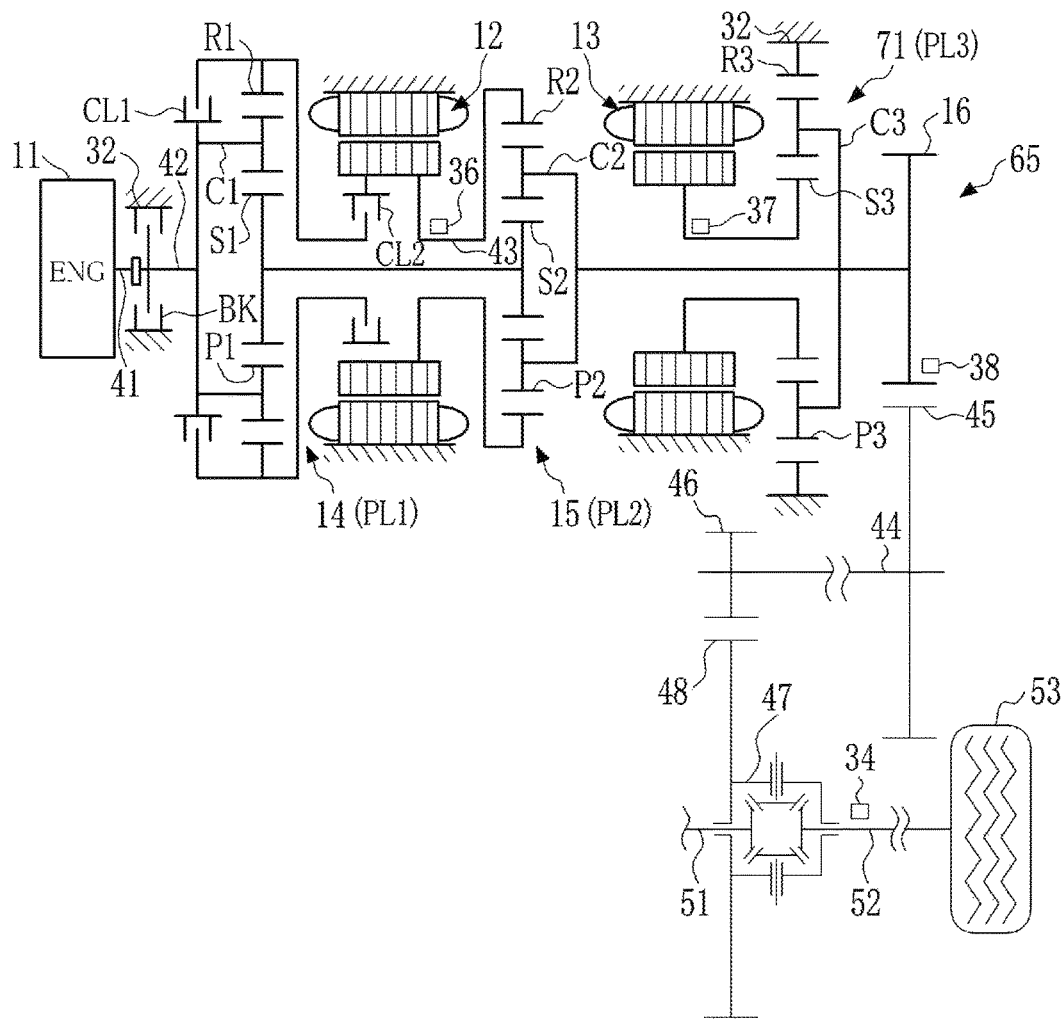
FIG. 47 is a skeleton diagram indicating the drive unit of a thirteenth embodiment.

FIG. 47 is a skeleton diagram of the drive unit 65 in a thirteenth embodiment. In the thirteenth embodiment, the first carrier C1 serves as the first rotary element 25 shown in FIG. 32, the first sun gear S1 serves as the second rotary element 26 shown in FIG. 32, the first ring gear R1 serves as the third rotary element 27 shown in FIG. 32, the second sun gear S2 serves as the fourth rotary element 28 shown in FIG. 32, the second ring gear R2 serves as the fifth rotary element 29 shown in FIG. 32, and the second carrier C2 serves as the sixth rotary element 30 shown in FIG. 32.

In the thirteenth embodiment, the first clutch CL1 selectively connects the first carrier C1 and the first ring gear R1, the second clutch CL2 selectively connects the first ring gear R1 and the second ring gear R2, and the brake BK selectively connects the output shaft 41 and the stationary member 32.

The drive unit 65 according to the thirteenth embodiment further includes a third planetary gear unit 71. The third planetary gear unit 71 is a single-pinion planetary gear unit which is adapted to perform a differential action among a third sun gear S3, a third carrier C3, and a third ring gear R3. The third carrier C3 rotatably supports third pinion gears P3 interposed between the third sun gear S3 and the third ring gear R3. In the drive unit 65 according to the thirteenth embodiment, the first planetary gear unit 14, the first motor 12, the second planetary gear unit 15, the second motor 13, the third planetary gear unit 71, and the output member 16 are coaxially arranged with the output shaft 41 of the engine 11 in this order. In the third planetary gear unit 71, the third sun gear S3 is connected to the rotor 49 of the second motor 13, the third carrier C3 is connected to the output member 16, and the third ring gear R3 is connected to the stationary member 32. In other words, the third planetary gear unit 71 amplifies the drive torque generated by the second motor 13, the amplified torque is synthesized with the torques delivered from the second planetary gear unit 15 and the output member 16.

The operating modes available in the drive unit 65 according to the thirteenth embodiment is similar to the first to ninth modes shown in FIG. 19. In addition, the engagement states of the first clutch CL1, the second clutch CL2, and the brake BK for setting the first to ninth modes are also similar to the example shown in FIG. 3.

Figure 48:
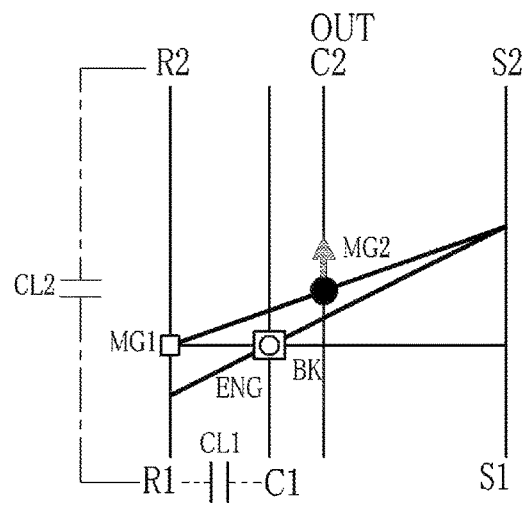
FIG. 48 is a nomographic diagram indicating an operating condition in the first mode of the drive unit illustrated in FIG. 47.

FIG. 48 indicates the operating condition of the complex planetary gear unit of the drive unit 65 illustrated in FIG. 47 in the first mode.

The operating condition in the first mode shown in FIG. 48 is substantially the same as the operating condition in the first mode shown in FIG. 4.

Figure 49:
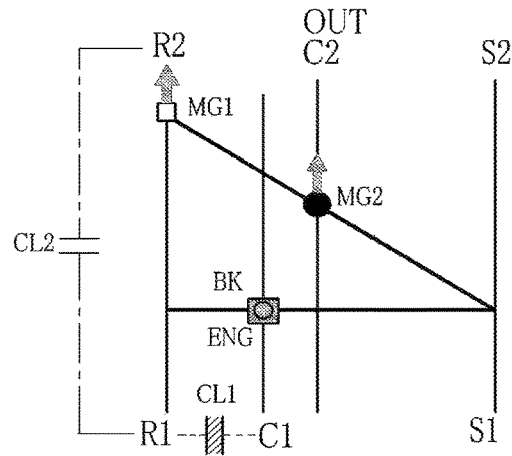
FIG. 49 is a nomographic diagram indicating an operating condition in the third mode of the drive unit illustrated in FIG. 47.

FIG. 49 indicates the operating condition of the complex planetary gear unit of the drive unit 65 illustrated in FIG. 47 in the third mode. The third mode shown in FIG. 49 is substantially the same as the operating condition of the third mode shown in FIG. 5.

Figure 50:
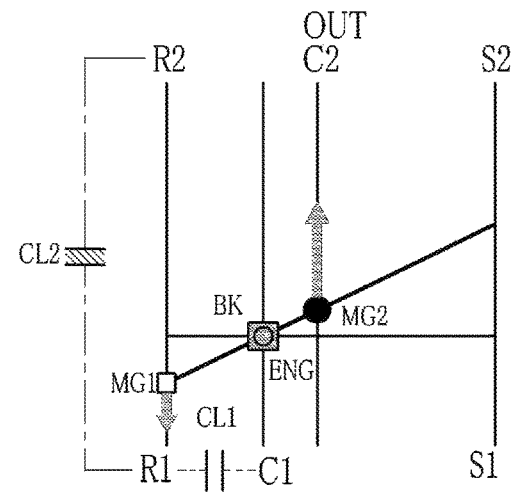
FIG. 50 is a nomographic diagram indicating an operating condition in the fourth mode of the drive unit illustrated in FIG. 47.

FIG. 50 indicates the operating condition of the complex planetary gear unit of the drive unit 65 illustrated in FIG. 47 in the fourth mode. The fourth mode shown in FIG. 50 is substantially the same as the operating condition in the fourth mode shown in FIG. 6.

Figure 51:
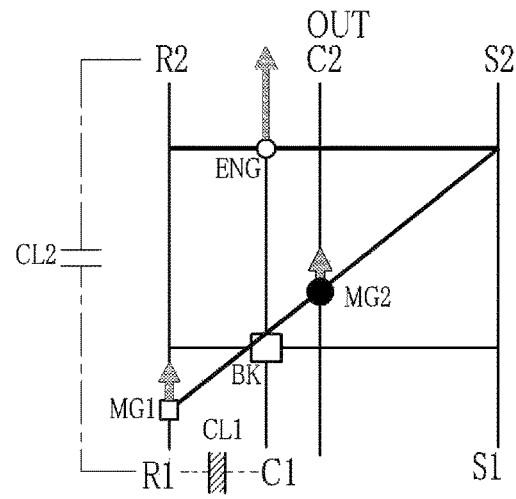
FIG. 51 is a nomographic diagram indicating an operating condition in the fifth mode of the drive unit illustrated in FIG. 47.

FIG. 51 indicates the operating condition of the complex planetary gear unit of the drive unit 65 illustrated in FIG. 47 in the fifth mode. The fifth mode shown in FIG. 51 is substantially the same as the operating condition in the fifth mode shown in FIG. 7.

Figure 52:
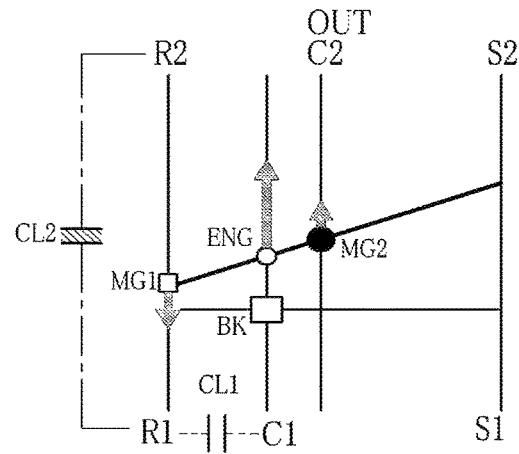
FIG. 52 is a nomographic diagram indicating an operating condition in the seventh mode of the drive unit illustrated in FIG. 47.

FIG. 52 indicates the operating condition of the complex planetary gear unit of the drive unit 65 illustrated in FIG. 47 in the seventh mode. The seventh mode shown in FIG. 52 is substantially the same as the operating condition in the seventh mode shown in FIG. 8.

Figure 53:
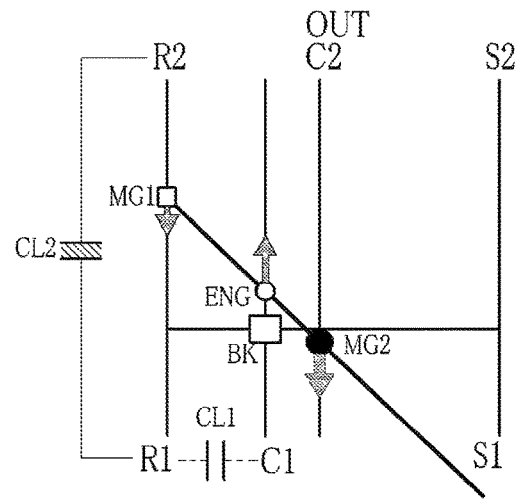
FIG. 53 is a nomographic diagram indicating an operating condition in the eighth mode of the drive unit illustrated in FIG. 47.

FIG. 53 indicates the operating condition of the complex planetary gear unit of the drive unit 65 illustrated in FIG. 47 in the eighth mode. The operating condition in the eighth mode shown in FIG. 53 is substantially the same as the operating condition in the eighth mode shown in FIG. 9.

Figure 54:
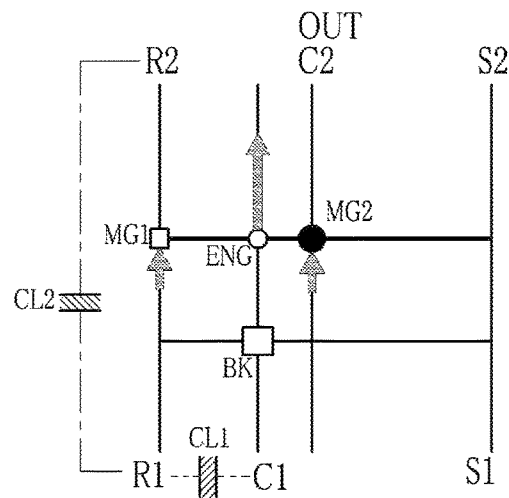
FIG. 54 is a nomographic diagram indicating an operating condition in the ninth mode of the drive unit illustrated in FIG. 47.

FIG. 54 indicates the operating condition of the complex planetary gear unit of the drive unit 65 illustrated in FIG. 47 in the ninth mode. The operating condition in the ninth mode shown in FIG. 54 is substantially the same as the operating condition in the fifth mode shown in FIG. 10.

Fourteenth Embodiment

In a fourteenth embodiment, the first sun gear S1 and the second carrier C2 in the thirteenth embodiment are connected, and the first carrier C1 and the second sun gear S2 are selectively connected.

In other words, the first ring gear R1 serves as the first rotary element 25 shown in FIG. 32, the first sun gear S1 serves as the second rotary element 26 shown in FIG. 32, the first carrier C1 serves as the third rotary element 27 shown in FIG. 32, the second carrier C2 serves as the fourth rotary element 28 shown in FIG. 32, the second ring gear R2 serves as the fifth rotary element 29 shown in FIG. 32, and the second sun gear S2 serves as the sixth rotary element 30 shown in FIG. 32.

In the fourteenth embodiment, the first clutch CL1 is configured to selectively connect the first ring gear R1 and the first carrier C1, the second clutch CL2 is configured to selectively connect the first carrier C1 and the second sun gear S2, and the brake BK is configured to selectively connect the output shaft 41 and the stationary member 32.

Figure 55:
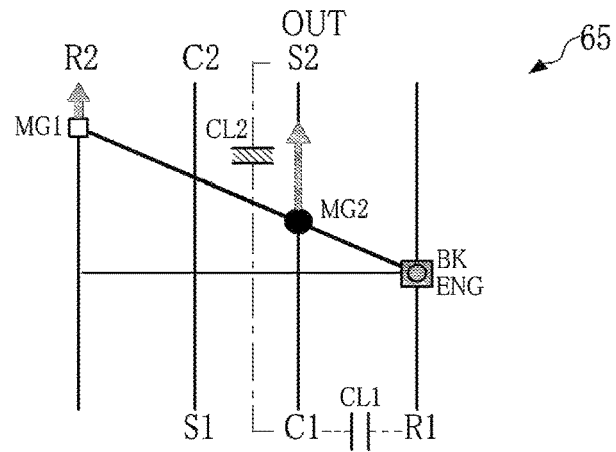
FIG. 55 is a nomographic diagram indicating an operating condition in the third mode of the drive unit of a fourteenth embodiment.

In the drive unit 65 according to the fourteenth embodiment, the third mode is established by disengaging the first clutch CL1 while engaging the second clutch CL2 and the brake BK. FIG. 55 indicates the operating condition of the complex planetary gear unit of the drive unit 65 according to the fourteenth embodiment in the third mode. As indicated in FIGS. 5 and 55, in the third mode, the operating condition of the complex planetary gear unit of the drive unit 65 according to the fourteenth embodiment is substantially the same as that of the complex planetary gear unit shown in FIG. 5.

Figure 56:
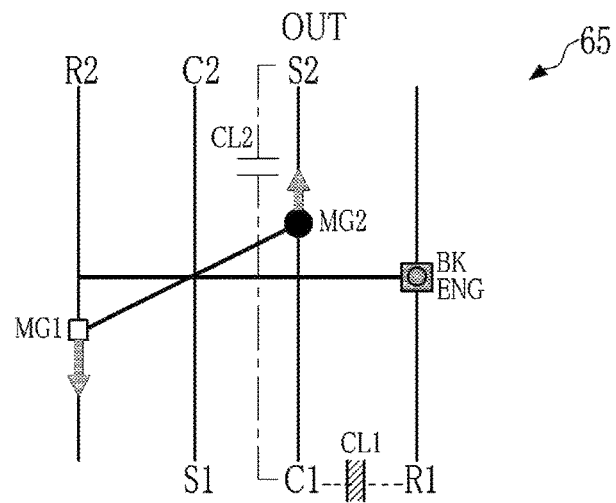
FIG. 56 is a nomographic diagram indicating an operating condition in the fourth mode of the drive unit illustrated in FIG. 55.

In the drive unit 65 according to the fourteenth embodiment, the fourth mode is established by disengaging the second clutch CL2 while engaging the first clutch CL1 and the brake BK. FIG. 56 indicates the operating condition of the complex planetary gear unit of the drive unit 65 according to the fourteenth embodiment in the fourth mode. As indicated in FIGS. 6 and 56, in the fourth mode, the operating condition of the complex planetary gear unit of the drive unit 65 according to the fourteenth embodiment is substantially the same as that of the complex planetary gear unit shown in FIG. 6.

Fifteenth Embodiment

In a fifteenth embodiment, the first ring gear R1 and the second carrier C2 in the thirteenth embodiment are connected, and the first carrier C1 and the second ring gear R2 are selectively connected.

In other words, the first sun gear S1 serves as the first rotary element 25 shown in FIG. 32, the first ring gear R1 serves as the second rotary element 26 shown in FIG. 32, the first carrier C1 serves as the third rotary element 27 shown in FIG. 32, the second carrier C2 serves as the fourth rotary element 28 shown in FIG. 32, the second sun gear S2 serves as the fifth rotary element 29 shown in FIG. 32, and the second ring gear R2 serves as the sixth rotary element 30 shown in FIG. 32.

In the fifteenth embodiment, the first clutch CL1 selectively connects the first sun gear S1 and the first carrier C1, the second clutch CL2 selectively connects the first carrier C1 and the second ring gear R2, and the brake BK selectively connects the output shaft 41 and the stationary member 32.

Figure 57:
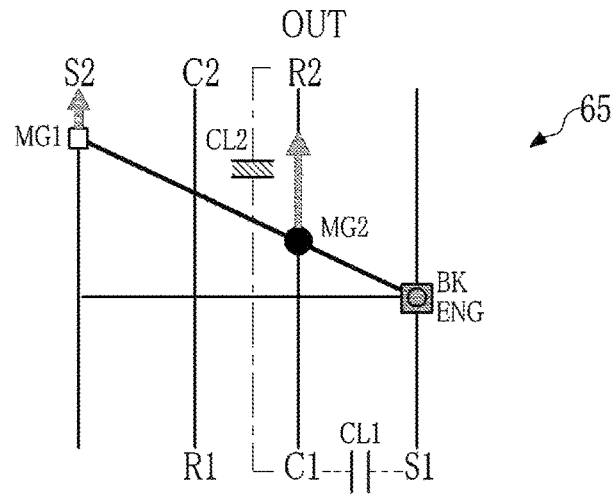
FIG. 57 is a nomographic diagram indicating an operating condition in the third mode of the drive unit of a fifteenth embodiment.

In the drive unit 65 according to the fifteenth embodiment, the third mode is established by disengaging the first clutch CL1 while engaging the second clutch CL2 and the brake BK. FIG. 57 indicates the operating condition of the complex planetary gear unit of the drive unit 65 according to the fifteenth embodiment in the third mode. As indicated in FIGS. 5 and 57, in the third mode, the operating condition of the complex planetary gear unit of the drive unit 65 according to the fifteenth embodiment is substantially the same as that of the complex planetary gear unit shown in FIG. 5.

Figure 58:
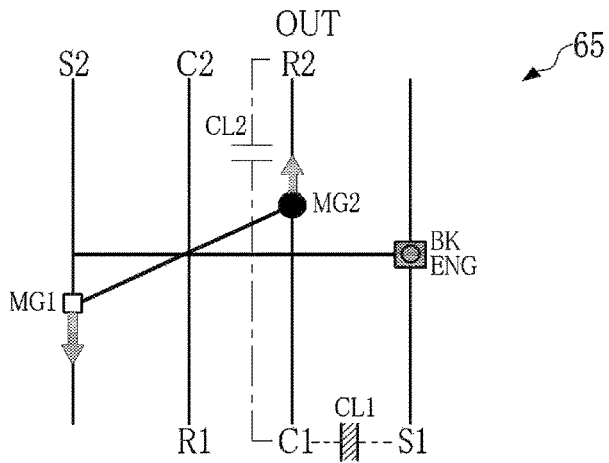
FIG. 58 is a nomographic diagram indicating an operating condition in the fourth mode of the drive unit illustrated in FIG. 57.

In the drive unit 65 according to the fifteenth embodiment, the fourth mode is established by disengaging the second clutch CL2 while engaging the first clutch CL1 and the brake BK. FIG. 58 indicates the operating condition of the complex planetary gear unit of the drive unit 65 according to the fifteenth embodiment in the fourth mode. As illustrated in FIGS. 6 and 58, in the fourth mode, the operating condition of the complex planetary gear unit of the drive unit 65 according to the fifteenth embodiment is substantially the same as that of the complex planetary gear unit shown in FIG. 6.

Sixteenth Embodiment

In the drive unit 65 of the sixteenth embodiment, the first sun gear S1 and the second carrier C2 in the thirteenth embodiment are connected, and the first carrier C1 and the second ring gear R2 are selectively connected.

In other words, the first ring gear R1 serves as the first rotary element 25 shown in FIG. 32, the first sun gear S1 serves as the second rotary element 26 shown in FIG. 32, the first carrier C1 serves as the third rotary element 27 shown in FIG. 32, the second carrier C2 serves as the fourth rotary element 28 shown in FIG. 32, the second sun gear S2 serves as the fifth rotary element 29 shown in FIG. 32, and the second ring gear R2 serves as the sixth rotary element 30 shown in FIG. 32.

In the sixteenth embodiment, the first clutch CL1 selectively connects the first ring gear R1 and the first carrier C1, the second clutch CL2 selectively connects the first carrier C1 and the second ring gear R2, and the brake BK selectively connects the output shaft 41 and the stationary member 32.

Figure 59:
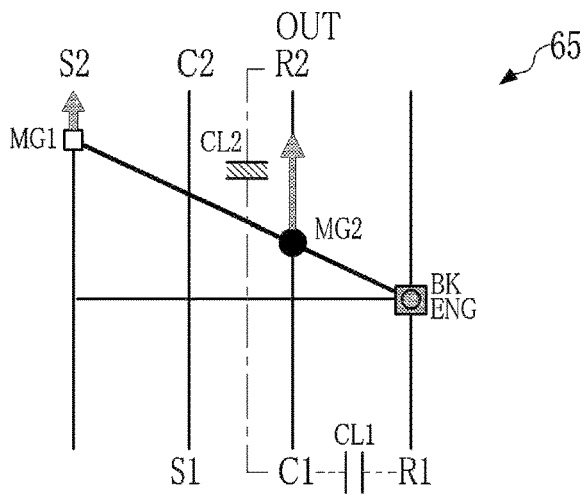
FIG. 59 is a nomographic diagram indicating an operating condition in the third mode of the drive unit of a sixteenth embodiment.

In the drive unit 65 according to the sixteenth embodiment, the third mode is established by disengaging the first clutch CL1 while engaging the second clutch CL2 and the brake BK. FIG. 59 indicates the operating condition of the complex planetary gear unit of the drive unit 65 according to the sixteenth embodiment in the third mode. As indicated in FIGS. 5 and 59, in the third mode, the operating condition of the complex planetary gear unit of the drive unit 65 according to the fifteenth embodiment is substantially the same as that of the complex planetary gear unit shown in FIG. 5.

Figure 60:
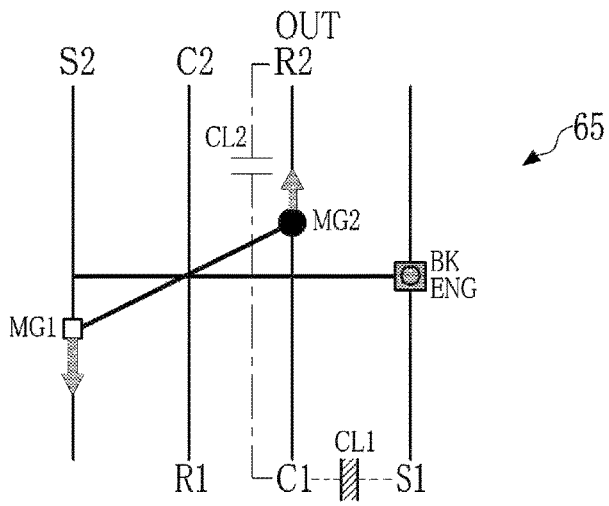
FIG. 60 is a nomographic diagram indicating an operating condition in the fourth mode of the drive unit illustrated in FIG. 59.

In the drive unit 65 according to the sixteenth embodiment, the fourth mode is established by disengaging the second clutch CL2 while engaging the first clutch CL1 and the brake BK. FIG. 60 indicates the operating condition of the complex planetary gear unit of the drive unit 65 according to the sixteenth embodiment in the fourth mode. As indicated in FIGS. 6 and 60, in the fourth mode the operating condition of the complex planetary gear unit of the drive unit 65 according to the fifteenth embodiment is substantially the same as that of the complex planetary gear unit shown in FIG. 6.

Although the above exemplary embodiments of the present application have been described, it will be understood by those skilled in the art that the present application should not be limited to the described exemplary embodiments, and various changes and modifications can be made within the spirit and scope of the present disclosure.

For example, at least any one of the respective planetary gear units may be replaced with a double-pinion planetary gear unit and, in that case, the carrier and the ring gear may be switched. In addition, the drive torque output from the second motor 13 may be delivered to a wheel different from the wheel to which the drive torque of the first motor 12 is transferred.

What is claimed is:

1. A drive unit for a hybrid vehicle wherein a prime mover includes an engine, a first motor, and a second motor, and wherein a drive torque generated by the prime mover is delivered to an output element connected to drive wheels, comprising:
   a first differential mechanism that includes a first rotary element connected to the engine, a second rotary element, and a third rotary element;
   a second differential mechanism that includes a fourth rotary element connected to the second rotary element, a fifth rotary element connected to the first motor, and a sixth rotary element directly connected to the second motor and the output element;

a first engagement device that connects any two of the first rotary element, the second rotary element, and the third rotary element when engaged;

a second engagement device that connects the third rotary element to any one of the fifth rotary element and the sixth rotary element when engaged; and a third engagement device that connects the first rotary element and a predetermined stationary member when engaged.

2. The drive unit for the hybrid vehicle according to claim 1, wherein the first engagement device is adapted to selectively connect the first rotary element and the third rotary element.

3. The drive unit for the hybrid vehicle according to claim 2, wherein the second engagement device is adapted to selectively connect the third rotary element and the fifth rotary element.

4. The drive unit for the hybrid vehicle according to claim 2, wherein the second engagement device is adapted to selectively connect the third rotary element and the sixth rotary element.

5. The drive unit for the hybrid vehicle according to claim 1, wherein the first engagement device is adapted to selectively connect the first rotary element and the second rotary element.

6. The drive unit for the hybrid vehicle according to claim 1, wherein the first engagement device is adapted to selectively connect the second rotary element and the third rotary element.

7. The drive unit for the hybrid vehicle according to claim 1, wherein the first differential mechanism includes a planetary gear unit, and wherein the planetary gear unit comprises:
  a first sun gear that serves as the first rotary element;
  a first ring gear that serves as the second rotary element; and
  a first carrier that serves as the third rotary element.

8. The drive unit for the hybrid vehicle according to claim 7, wherein the second differential mechanism includes a planetary gear unit, and wherein the planetary gear unit comprises:
  a second carrier that serves as the fourth rotary element;
  a second sun gear that serves as the fifth rotary element; and
  a second ring gear that serves as the sixth rotary element.

9. The drive unit for the hybrid vehicle according to claim 7, wherein the second differential mechanism includes a planetary gear unit, and wherein the planetary gear unit comprises:
  a second carrier that serves as the fourth rotary element;
  a second ring gear that serves as the fifth rotary element; and
  a second sun gear that serves as the sixth rotary element.

10. The drive unit for the hybrid vehicle according to claim 7, wherein the second differential mechanism includes a planetary gear unit, and wherein the planetary gear unit comprises:
  a second ring gear that serves as the fourth rotary element;
  a second sun gear that serves as the fifth rotary element; and
  a second carrier that serves as the sixth rotary element.

11. The drive unit for the hybrid vehicle according to claim 7, wherein the second differential mechanism includes a planetary gear unit, and wherein the planetary gear unit comprises:
  a second sun gear that serves as the fourth rotary element;
  a second ring gear that serves as the fifth rotary element; and
  a second carrier that serves as the sixth rotary element.

12. The drive unit for the hybrid vehicle according to claim 1, wherein the first differential mechanism includes a planetary gear unit, and wherein the planetary gear unit comprises:
  a first ring gear that serves as the first rotary element;
  a first sun gear that serves as the second rotary element; and
  a first carrier that serves as the third rotary element.

13. The drive unit for the hybrid vehicle according to claim 1, wherein the first differential mechanism includes a planetary gear unit, and wherein the planetary gear unit comprises:
  a first carrier that serves as the first rotary element;
  a first sun gear that serves as the second rotary element; and
  a first ring gear that serves as the third rotary element.

14. The drive unit for the hybrid vehicle according to claim 1, wherein the first differential mechanism includes a planetary gear unit, and wherein the planetary gear unit comprises:
  a first sun gear that serves as the first rotary element;
  a first carrier that serves as the second rotary element; and
  a first ring gear that serves as the third rotary element.

15. The drive unit for the hybrid vehicle according to claim 1, wherein a speed ratio between the sixth rotary element and the second motor is fixed.

* * * * *